US010451519B2

(12) United States Patent
Likins, Jr. et al.

(10) Patent No.: US 10,451,519 B2
(45) Date of Patent: Oct. 22, 2019

(54) NON-CONTACT STRAIN MEASUREMENT SYSTEM AND METHOD FOR USING THE SAME

(71) Applicant: Pile Dynamics, Inc., Solon, OH (US)

(72) Inventors: Garland E. Likins, Jr., Newbury, OH (US); George R. Piscsalko, Aurora, OH (US); Dean A. Cotton, Fairview Park, OH (US); Brent Robinson, Shaker Heights, OH (US); Frank Rausche, Chagrin Falls, OH (US); Richard E. Berris, Jr., Chagrin Falls, OH (US)

(73) Assignee: Pile Dynamics, Inc., Solon, OH (US)

( * ) Notice: Subject to any disclaimer, the term of this patent is extended or adjusted under 35 U.S.C. 154(b) by 89 days.

(21) Appl. No.: 15/904,376

(22) Filed: Feb. 25, 2018

(65) Prior Publication Data
US 2018/0246006 A1    Aug. 30, 2018

Related U.S. Application Data

(60) Provisional application No. 62/463,934, filed on Feb. 27, 2017.

(51) Int. Cl.
*G01M 11/08* (2006.01)
*G01L 1/22* (2006.01)
(Continued)

(52) U.S. Cl.
CPC .......... *G01M 11/081* (2013.01); *G01B 11/16* (2013.01); *G01D 5/34707* (2013.01);
(Continued)

(58) Field of Classification Search
CPC ... G01M 11/081; G01M 5/0058; G06T 7/254; G06T 7/248; G01B 11/16;
(Continued)

(56) References Cited

U.S. PATENT DOCUMENTS 3,974,332 A    8/1976   Abe et al.
4,030,347 A    6/1977   Norris et al.
(Continued)

FOREIGN PATENT DOCUMENTS

CN    102147231 A    8/2011
CN    202435518 U    9/2012

OTHER PUBLICATIONS

International Search Report, Cited in corresponding PCT/US18/19603, dated May 11, 2018, 12 pages.
(Continued)

*Primary Examiner* — Jamil Ahmed
(74) *Attorney, Agent, or Firm* — Rankin, Hill & Clark LLP

(57) ABSTRACT

A non-contact strain and/or displacement measurement system for use with structural objects having an optical device, a data store and an image arrangement that is fixed relative to the structural object to be tested, the optical device including an image receiving device for receiving visual images and the data store being configured to record the received visual images, the image receiving device being spaced from the image arrangement by an optical spacing such that the image receiving device has a visual range that includes a portion of the structural object and the image arrangement being within the portion, the image arrangement having at least one image element wherein movement of the at least one image element during a measurement period provides image data to calculate structural object strain and/or structural object displacement.

19 Claims, 13 Drawing Sheets

(51) Int. Cl.
*G01L 1/10* (2006.01)
*G01B 11/16* (2006.01)
*G06T 7/246* (2017.01)
*G01D 5/347* (2006.01)
*G06T 7/254* (2017.01)
*G01M 5/00* (2006.01)
*E02D 5/22* (2006.01)
*E02D 13/00* (2006.01)

(52) U.S. Cl.
CPC .............. *G01L 1/103* (2013.01); *G01L 1/225* (2013.01); *G01M 5/0058* (2013.01); *G06T 7/248* (2017.01); *G06T 7/254* (2017.01); *E02D 5/22* (2013.01); *E02D 13/005* (2013.01)

(58) Field of Classification Search
CPC ..... G01D 5/34707; G01L 1/103; G01L 1/225; E02D 5/22; E02D 13/005
See application file for complete search history.

(56) References Cited

U.S. PATENT DOCUMENTS

| | | |
|---|---|---|
| 4,359,720 A | 11/1982 | Chai et al. |
| 4,420,754 A | 12/1983 | Andermo |
| 4,526,043 A | 7/1985 | Boie et al. |
| 4,543,526 A | 9/1985 | Burckhardt et al. |
| 4,591,996 A | 5/1986 | Vachon |
| 5,174,159 A | 12/1992 | Jacobsen et al. |
| 5,978,749 A | 11/1999 | Likins, Jr. et al. |
| 6,301,551 B1 | 10/2001 | Piscalko et al. |
| 6,533,502 B2 | 3/2003 | McVay et al. |
| 6,744,931 B2 | 6/2004 | Komiya et al. |
| 7,533,557 B1 | 5/2009 | Mott et al. |
| 8,161,823 B2 | 4/2012 | Berris |
| 2010/0118144 A1 | 5/2010 | Fawcett et al. |
| 2013/0107004 A1* | 5/2013 | Maeda ............... G01B 11/16 348/46 |
| 2016/0109058 A1 | 4/2016 | Bennett et al. |

OTHER PUBLICATIONS

Espacenet Bibliographic data:CN202435518 (U), Published Sep. 12, 2012, 1pg.
Espacenet Bibliographic data:CN102147231 (A), Published Aug. 10, 2011, 1 pg.

* cited by examiner

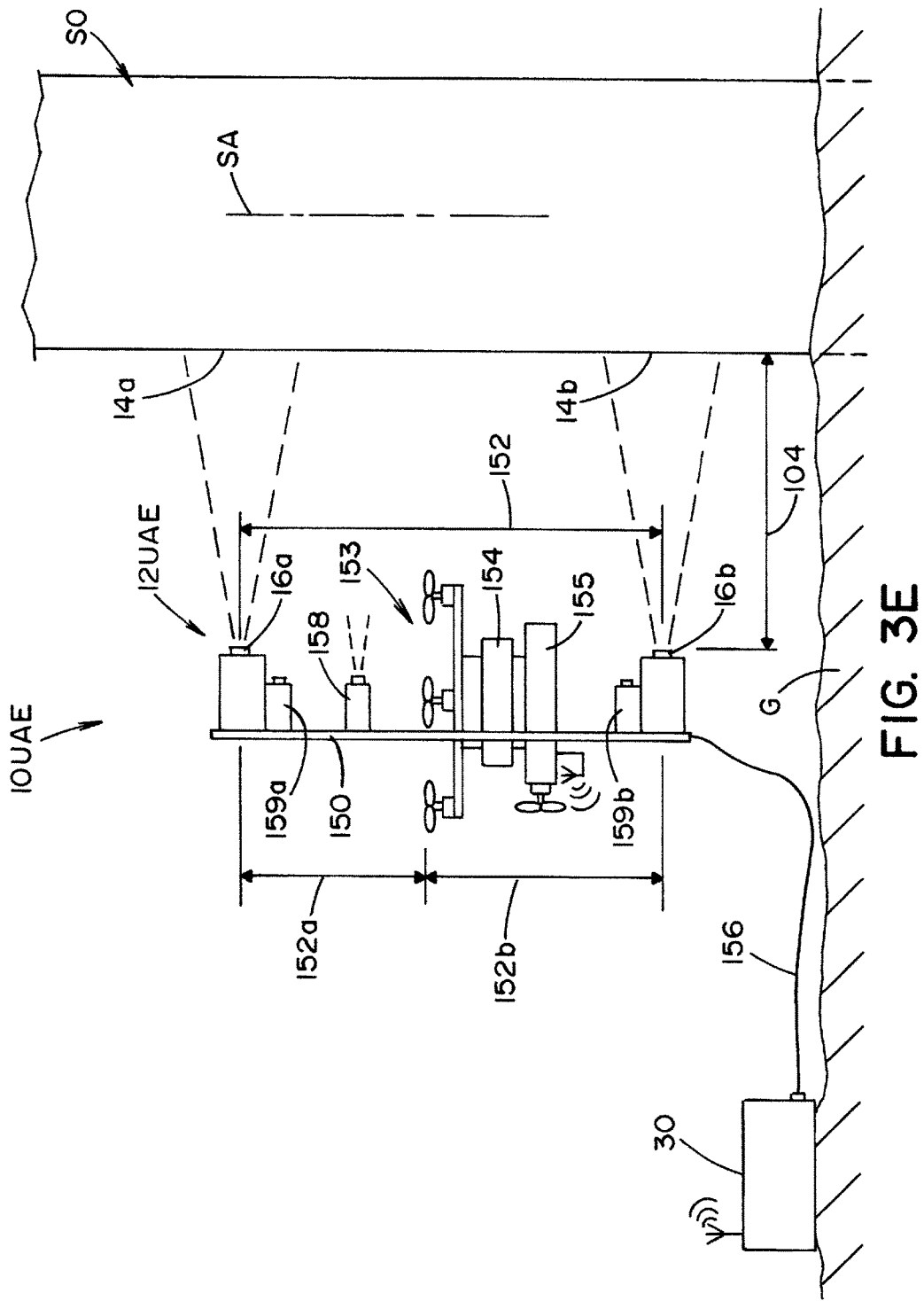

NON-CONTACT STRAIN MEASUREMENT SYSTEM AND METHOD FOR USING THE SAME

This application claims priority to provisional patent application Ser. No. 62/463,934 filed on Feb. 27, 2017 which is incorporated by reference herein.

This application relates to a non-contact strain measurement system and a method for using the same. More particularly, the invention relates to a non-contact strain measurement system and a method for using the same for use with structural objects, such as structural piles, columns and other load bearing structural components or objects under static and/or variable loads.

INCORPORATION BY REFERENCE

U.S. Pat. No. 5,978,749 to Likins et al. discloses a pile installation recording system and is hereby incorporated by reference into this application in its entirety for showing the same. U.S. Pat. No. 6,301,551 to Piscsalko et al. discloses a remote pile driving analyzer and is hereby incorporated by reference into this application in its entirety for showing the same. U.S. Pat. No. 6,533,502 to McVay et al. discloses a wireless apparatus and method for analysis of piles and is hereby incorporated by reference into this application in its entirety for showing the same. U.S. Pat. No. 8,161,823 to Berris discloses a strain and displacement sensor and system and method for using the same and is hereby incorporated by reference into this application in its entirety for showing the same.

BACKGROUND OF THE INVENTION

Strain sensors are employed for measuring the shear strain on a structure. Conventional strain sensors use a flexible backing that supports a metallic foil pattern and are mounted directly to a structure to be tested. When the structure is deformed due to shear strain, the metallic foil is deformed, which alters the electrical resistance of the foil. By measuring the electrical resistance across the terminals of the foil, the strain of the structure may be measured. However, the metallic foil may become permanently deformed or detached from the backing over time.

Vibrating wire gauges have also been be used to detect strain. A vibrating wire sensor measures force using a wire that vibrates at a high frequency. The applied external force changes the tension on the wire and this changes the frequency. The frequency is measured and indicates the amount of force on the sensor. The load sensor can have an integrated electronic system to both activate the vibrating wire as well as to read the frequency. The strain is calculated by measuring the resonant frequency of the wire wherein an increase in tension increases the resonant frequency. However, these gauges must be connected directly to the structure to be measured or embedded in the structure to be measured wherein they can be damaged during installation and can be difficult to utilize after the pile and/or structural object is in operation.

U.S. Pat. No. 8,161,823 to Berris overcomes many of the problems in the prior art by utilizing a capacitively-coupled strain sensor, which includes a first board and a second board, both with conductive pads. An insulating layer is included between the boards to create a capacitive network between the conductive pads on the boards. In Berris, provided is a capacitive network created by the boards and the insulating layer that creates a capacitive full bridge. In certain embodiments, the first board includes an oscillatory signal driver that produces an oscillatory signal, which is fed to conductive coupling pads on the first board. The oscillatory signal passes to the second board via the coupling capacitors of the capacitive network and returns to the first board via the signal capacitors of the capacitive network. The resulting signal is indicative of the amount of strain on the structure and/or the displacement of one board relative to the other board. The sensor can thus be used to perform a strain sensing function and/or a displacement calculation without a conductor linking the two boards. However, while Berris has been found to be an effective strain gauge, it still requires direct contact with the object to be measured. In this respect, while prior art sensors are effective, they require the sensors to be either embedded into the structural object or attached to the structural object. Sensors that are embedded into the structural object are expensive since the sensor can only be used once since it remains in the structural object. While sensors that are attached to the structural object can be re-used, it is time consuming to properly attach, remove, unattach, and reattach each sensor from the structural object. Frequently, adhesives cannot be used since adhesives take too long to set, are impractical to apply in adverse weather conditions such as in rain or extreme cold conditions, and they are not strong enough for the shear stresses associated with strain measurements in a dynamic environment. More importantly, using adhesives to attach the strain sensors has been found to be less accurate. Therefore, the sensors must be bolted to the structural object, which is time consuming and potentially damaging to the structure. Yet further, having to bolt a sensor to the structural object means that only one location of the structure is tested unless multiple sensors are mounted to the structural object or the sensors are repeatedly removed and moved to different locations, which is especially difficult and time consuming for the testing of driven piles. Moreover, the locations in which the sensors must be attached can be difficult to access. Thus, there is a continuing need for a strain sensor and/or strain sensor system that eliminates the current requirement to make a mechanical connection between the sensor and the object to be tested.

SUMMARY OF THE INVENTION

The present invention relates to a non-contact strain and/or displacement sensor apparatus and system that may be employed to facilitate sensing of a wide range of factors including the shear strain on a structural object.

More particularly, provided is a non-contact strain and/or displacement sensor system that utilizes optics to detect and/or measure strain in a structural object, such as a pile, wherein a traditional strain gauge or sensor does not have to be mechanically coupled to the structural object.

According to certain aspects of the invention, provided is a strain and/or displacement sensor system that utilizes an image receiving device, such as a high-speed camera, or other device for recording visual images, in combination with images that are marked onto the object to be measured. Analysis of the captured images from the high-speed image receiving device can be used to detect movement, compression, extension, rotation and other data of the image elements of the image marked on the object being analyzed.

According to other aspects, the measurements using the invention of this application are a dynamic test of the movement of the object along with a static test. In this respect, the strain and/or displacement sensor apparatus that utilizes a high-speed camera or other device for recording visual images in combination with images that are marked onto the object can measure displacement to detect velocity and/or strain dynamically.

According to yet other aspects of the invention, the system can include multiple high-speed image receiving devices and/or multiple sets of marked images on the object to be measured. This can be utilized to ensure that the marked images line up with the optics of the device and/or to take multiple reading about the object to be measured and/or simultaneously along the length of the object to be measured.

According to yet further aspects of the invention, multiple optics and/or multiple image sets could be used; including a plurality of image sets including four or more sets.

According to even yet further aspects of the invention, the device for recording visual images can be secured to a support arrangement that allowed the visual device to rotate about a mount or optics axis to allow the visual device to track with the object to be measured.

According to even yet further aspects of the invention, the device for recording visual images can be configured to detect a wide range of images and/or reflections related to the marked images including, but not limited to, detecting a focused beam of light that is reflected off of a surface of the objected to be measured and/or a surface material fixed relative to the object to be tested.

These and other objects, aspects, features, embodiments and advantages of the invention will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3E shows a non-contact strain sensor system utilizing a UAV arrangement;

DETAILED DESCRIPTION OF EMBODIMENTS

Figure 1:
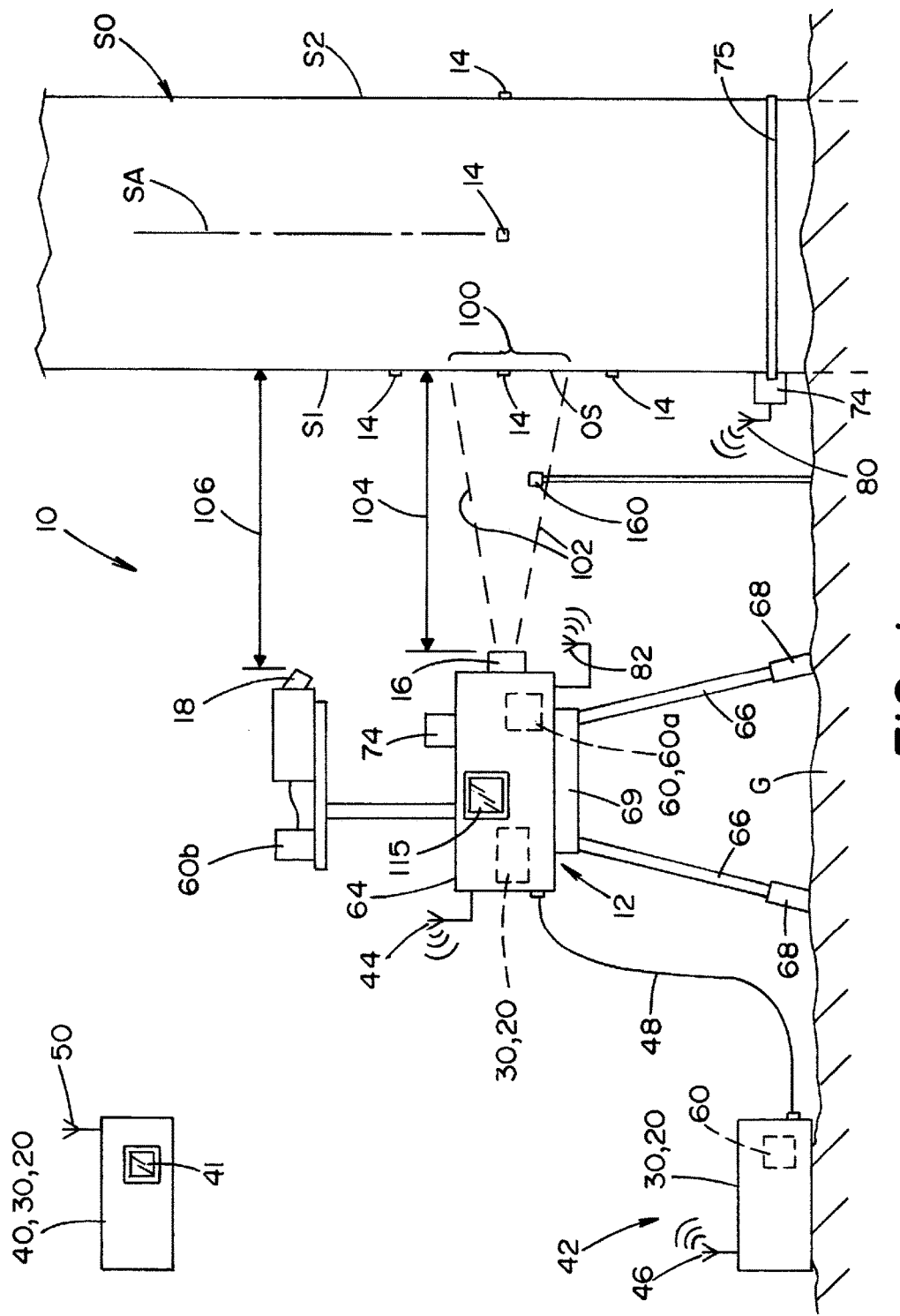
FIG. 1 is an elevational view of a structural object, such as a pile structure, showing certain aspects of the non-contact strain sensor system according to certain aspects of the invention of this application.

Referring now to the drawings wherein the showings are for the purpose of illustrating preferred and alternative embodiments of the invention only and not for the purpose of limiting same, FIG. 1 shows certain embodiments of a non-contact strain and/or displacement sensor system 10 for use in connection with sensing the strain on an associated pile, structure component or structural object and/or the displacement of the structural object. In this respect, the disclosed non-contact strain sensor system can be used for a wide range of applications that monitor relative movement of at least one point on the structural object being tested. In this respect, monitoring one point can be used to show dynamic behavior of the vibration from an impact, such as a hammer blow. According to other embodiments, the disclosed non-contact strain sensor system can monitor relative movement of two or more points to also determine strain along with displacement. As will be discussed more below, the word "point" is not to be limited to geometric element that has zero dimensions but relates to a location along the structural object. Moreover, monitoring and detecting can be accomplished without requiring the securing of any equipment and/or sensors relative to the tested object. In addition, the sensor system of this application can measure both static and/or dynamic strain, which will also be discussed in greater detail below. Yet further, the system of this application can be easily adapted to be used with any other equipment or systems used during the installation and/or testing of the structural object after installation. Yet even further, the system and the components of the system can be reusable.

With special reference to FIG. 1, shown is a structural object SO, such as a pile, extending above a ground layer G. Structural object SO can be a wide range of structural objects including, but not limited to, a column, a girder, a driven pile, a pressed in pile, and/or a poured in place pile, or the like, without detracting from the invention of this application wherein this application is not to be limited to a particular structural object. For the systems of this application, it can be utilized during the driving process to help monitor the driving process as the structural object is driven into ground layer G or could be used during a testing phase after the structural object has been driven, poured and/or otherwise installed. Moreover, the invention of this application is not to be limited to testing in-ground structural objects. Thus, while the invention is shown with respect to one type of structural object in the interest of brevity, it is not to be limited to the structural object shown in the drawings. For any structural object, including poured in place piles and pressed in piles, the system of this application can be utilized during the testing phase when it is determined if the pile or structural object meets the requirements for the job. As can be appreciated, by not having any mechanical structures that must be attached relative to the structural object itself, there are no sensitive mechanical structures subjected to the harsh environment near the hammering of a pile or structural object into the ground and/or impacting the structural object for testing. Accordingly, the invention of this application has a further advantage of a substantially reduced likelihood of damage during use. Furthermore, for structural objects, such as poured structural objects, wherein testing is only desired after installation, eliminating the requirement to secure a mechanical structure to the object being tested can save time and money. As a result, the invention of this application has the advantage over prior art devices in that there is no cost associated with mechanically coupling a strain and/or displacement sensor directly to the structural object, no cost associated with mechanically de-coupling the sensor from the structural object, less cost associated with damaged sensors and/or there is no cost associated with the loss of the sensor for the sensors that are cast or otherwise permanently joined relative to the structural object. The invention is indefinitely reusable and less likely to be damage wherein the invention is very cost efficient and reliable.

In greater detail, non-contact sensor system 10 includes an optical device 12 and an image arrangement(s) 14. Optical device 12 includes an image receiving device 16, which can be any device for receiving and/or recording a visual image (of any type) including, but not limited to, a high-speed camera, an optical sensor, a visual sensor, a CCD (charge-coupled device) and/or a CMOS (complementary metal-oxide semiconductor) image sensors, a line camera, an area scan camera (fixed (synchronous) or variable (asynchronous)) or the like. In one set of embodiments, optical device 12 can further include a light emitting device 18 that can enhance or replace natural light (see FIG. 1) and/or create a detection light for device 16 (see FIG. 2), which will be discussed more below. Light emitting device 18 can be any light emitting device that, for example, enhances existing light (FIG. 1), prevents shadows and/or produces a detectable light (FIG. 2) including, but not limited to, a flash or strobe light, a continuous light source, incandescent (tungsten) lights, fluorescent lights, halogen (or quartz) lights, and Hydrargyrum Medium Arc-length Iodide lights, HMI lights, xenon lights, krypton lamps, light-emitting diodes (LED) in any color, lasers and the like. Moreover, and as will be discussed more below, optical device 12, image receiving device 16 and/or light emitting device 18 can be multiple optical devices 12, multiple image receiving devices 16 and/or multiple light emitting devices 18 (see FIGS. 4&5).

Sensor system 10 and/or optical device 12 includes memory or data store 20, which can be an on board data store in device 12. However, data store 20 can be any data storage device including, but not limited to, one or more of an internal hard drive, an external hard drive, a Solid State Drive (SSD), a Network Attached Storage (NAS), a USB drive, a USB thumb drive, a flash drive, an optical drive (CD/DVD) and/or a cloud storage arrangement, and/or the like. Moreover, data store 20 can include removable drives and/or internal drives and can be a part of any component of system 10.

Data store 20 can also be in communication with a computing system 30. Computing system 30 can generate the strain and/or displacement results based on data from optical device 12. Moreover, data store 20 can include a data store in the computing system and/or can include operating instructions for the system and/or components of the system.

Computing system 30 can be any control and/or analysis device configured to operate system 10, collect data and/or analyze data and can include, but is not limited to, a computer system, a laptop, a tablet, a smart phone, a hand held system, a wrist mounted system, a cloud based system wherein the computer is a server somewhere offsite and/or the like. In that these types of systems are known in the art, details are not included in this application in the interest of brevity. Yet further, the computing system can be an onboard component of optical device 12, a local system 30 in communication with the optical device and/or a remote system 40 that is at a location spaced from the work being performed. As can be appreciated, any remote location could be utilized including, but not limited to, a system located at a location on the jobsite that is spaced from the actual testing area, a location away from the jobsite and/or a central control facility that could be spaced in a different geographic region. Moreover, the computing system can be multiple computing systems and/or can include separate display devices.

Yet even further, optical device 12 can be a self-contained unit that can operate at least partially independently wherein optical device 12 could even include some or all of computing system 30, and can eliminate the need for onsite computing system 30 and/or merely need onsite computing system 30 to be a conduit to one or more offsite systems 40. For example, optic device 12 could be configured to transmit directly to offsite location system 40, such as transmitting directly to a cloud computing location or system during the data collection and/or transmission phases based on a direct connection such as by way of any technology, such as a cellular connection, between optical device 12 and a cellular service. Further, optical device 12 could include one or more screens, displays and/or inputs 115 to allow it to act as a fully functioning operating system. In other systems, the optical device can include the computing device and could include a display device, removable data store, communication system and/or other systems to allow creation, display and/or transmission of data and/or results of the analysis. The connection of the components of the system can be by any arrangement known in the art including wired and wireless connections.

In one set of embodiments, optical device 12 is in direct communication with local computing system 30 by way of one or more wireless communication systems 42. This direct connection can be in real time and/or intermittent as is desired and/or required. In these embodiments, wireless communication system 42 is a wireless communication system that includes a first wireless antenna (internal and/or external) 44 connected to optical unit 12 and a second wireless antenna (internal and/or external) 46 connected to local computing system 30. These antennas can utilize any technology known in the art and are preferably transceivers that both send and receive data. Further, the antenna technology can depend on the location of the computing system relative to the optical system. In this respect, any communication system and/or technology could be used including all of the typical wireless Radio Frequency "RF" and/or optical communication links used by industry. RF links include, but are not limited to, BLUETOOTH®, ZigBee®, Wi-Fi, Universal Serial Bus and RS232 communication standards and/or systems. Optical communication links include, but are not limited to, Li-Fi, and the like.

Wireless communication system 42 allows optical system 12 to communicate with computing system 30 during a data collection phase and/or a data transmission phase without the need for wires thereby further simplifying the setup of system 10, simplifying the operation of the system, but this is not required. As can be appreciated, a wired system 48 could also be used for data communication and/or for a power supply. And, as is discussed above, optical system 12 could be in direct communication with offsite system 40 wherein either antenna 44 and/or 46 could communicate with offsite system 40 by way of antenna 50, which is illustrative only wherein any form of long distant electronic communication could be utilized. Again, the control, analysis and/or display unit(s) can be internal within optical device 12, on-site 30 and/or offsite 40 without detracting from the invention of this application. This includes the units being located at or near the structural object, at any location onsite, and/or at an offsite location at a remote location wherein the work for one or more tests is analyzed by an engineer that is offsite. Yet further, the system can further include a separate offsite control and/or display unit(s) 40 that works with onsite surface control and/or display unit(s) 30 or directly with optical device 12. Again, any system of communication known in the art can be used to communicate to, or from, the onsite and offsite location(s).

Again, optical device 12 can be a self contained system wherein it can include a self contained power supply 60 to provide electrical power to operate internal data store(s) 20, computing system(s) 30, image receiving device(s) 16, light emitting devices 18 and/or other components of device 12, which will be discussed in greater detail below. Moreover, power supply 60 can include multiple power supplies and/or differing types of power supplies. For example only, optical device 12 could include an internal power supply 60*a* to provide electrical power to operate internal systems data store(s) 20, computing system(s) 30 and/or image receiving device(s) 16 while using an external power supply 60*b* for light emitting device(s) 18 and/or other components. Power supply 60 can be any power supply known in the art including re-chargeable power systems, non-rechargeable battery systems and/or an external generated power supply (60*b*). Yet further, power supply 60 can include the use of interchangeable and/or rechargeable battery packs that allow for a longer operational life of the battery system. In that rechargeable and non-rechargeable battery systems and external generated power supplies are generally known, these will not be discussed in greater detail in the interest of brevity.

Again, in that optical device 12 can be a self-contained unit, optical device 12 can include computing system 30 and/or could even eliminate the need for an onsite computing system and/or merely need onsite computing system 30 to be a conduit to one or more offsite systems 40. For example, optical device 12 could be configured to transmit directly to offsite system 40, such as transmitting directly to a cloud computing location or system during the data collection and/or transmission phases based on a direct connection such as by way of a cellular connection between head unit 30 and a cellular service.

Further, optical device 12 can include a wide range of configuration without detracting from the invention of this application. For discussion only, wherein the following description is not intended to limit the invention of this application, optical device 12 can include an outer enclosure 64 that is formed by one or more structural components. Moreover, outer enclosure 64 can be a watertight enclosure to allow system 10 to be used in the harsh outside environments where structural objects are installed. Optical device 12 can further include a wide range of support arrangements 66 that can support enclosure 64 above ground layer G. In addition, support arrangement 66 can include one or more features to both isolate optical device 12 from vibration and allow the support to be adjustable such that optical device 12 can be used on uneven ground, can be aligned with image arrangement(s) 14 and/or can be in close proximity to structure SO during loading. In this respect, support arrangement 66 can include one or more adjusters 68 and one or more vibration isolation systems 69. Yet further, support arrangement 66, image receiving device(s) 16, light emitting device(s) 18 and/or optical device 12 can include one or more vertical adjustment systems 70 to allow image receiving device(s) 16, light emitting device(s) 18 and/or optical device 12 to be aligned with arrangement 14 and/or move with arrangement(s) 14 to extend the range of the system. However, it should be noted that the term "vertical is being used in reference to the drawings only. Any type of vertical adjustment system could be used without detracting from the invention of this application. This can include, but is not limited to, adjustment system 70 that moves image receiving device(s) 16, light emitting device(s) 18 camera 16 and/or optical device 12 longitudinally and parallel to a structural object axis SA. Further, multiple arrangements 14 can be vertically spaced along structural object to extend range to reduce the need for adjustment, which will be discussed more below.

According to yet another set of embodiments, optical device(s) 12, image receiving device(s) 16 and/or light emitting device(s) 18 can include an adjustable support that can include any mechanism to allow the system to follow image 14 and/or adjust the system relative to image 14. However, it must be noted that the mechanisms shown are examples only and do not limit the invention. The adjustable supports include a pivotable support 72 (FIGS. 3-5) and a linear motion support 72*a* (FIG. 3D). And, these supports can be used to allow optical device(s) 12, image receiving device(s) 16 and/or light emitting device(s) 18 to follow arrangement(s) 14 during installation as image(s) 14 move downwardly, which can also be used to extend the range of the system. Pivotable support 72 can be any pivotable joint and can work with vertical adjustment system 70 or instead of system 70. Pivotable support 72 can be fixed between optical device(s) 12, image receiving device(s) 16 and/or light emitting device(s) 18 and support arrangement 66, adjusters 68, vertical adjustment system 70 and/or vibration isolation system 69 to provide the changing angle of optical device(s) 12, image receiving device(s) 16 and/or light emitting device(s) 18 about an optics axis 73. Optics axis 73 is transverse to structural object axis SA, which can be a horizontal axis for vertical support structures. In the embodiments shown, the overall housing of optical device(s) 12, image receiving device(s) 16 and/or light emitting device(s) 18 can be pivotably joined to support 66, but this is not required. In this respect, the optical device(s) 12, image receiving device(s) 16 and/or light emitting device(s) 18 could include a pivotable lens, or the like, that could pivot instead of the overall housing structure without detracting from the invention of this application. When pivotable support 72 is used in system 10, the angle of the optical device(s) 12, image receiving device(s) 16 and/or light emitting device(s) 18 can be detected, sensed and/or determined and utilized by computing systems 30 and/or 40 to calculate the effect of the angle on the images collected.

Again, computing systems 30 and/or 40 can be any control unit configured to operate a system and/or collect data including, but not limited to, a computer system, a laptop, a tablet, a smart phone, a hand held system, a wrist mounted system and/or the like. In that these types of systems are known in the art, details are not included in this application in the interest of brevity.

Moreover, computing system 30 can include an internal computing system 30 within optical device 12 that can include memory or data store 20 wherein data store 20 can include one or more operating instructions for optical device 12 and/or computing systems 30 and/or 40 to control the data collection phase, store the data collected during the data collection phase and/or communicate the data during the data transmission phase. In some embodiments, the memory for the data memory is independent of the memory for the operating instructions.

Accordingly, system 10 can include one or more preprogrammed operation modes configured to automatically perform one or more desired testing routines and/or system adjustments. This can include the one or more operational steps for optical unit 12 during data collection. Further, this preprogrammed operation could include automatic guidance of the system based on input from one or more of the sensors. One such operating instructions can include a selective data acquisition mode to reduce the size of the stored data. In this respect, optical device 12 can include one or more high-speed and/or high-resolution image receiving devices 16. High-speed image receiving devices 16, such as high-speed cameras, can be part of enclosure 64, as is shown, and/or can be a part of one or more stand alone units. As can be appreciated, if multiple high-speed image receiving devices 16 are used, they can have different functions too.

High-speed image receiving devices are known in the art and will not be discussed in greater detail herein in the interest of brevity. As is known, a high-speed image receiving device, such as a high-speed camera, is a device capable of image exposures in excess of $\frac{1}{1,000}$ seconds or frame rates in excess of 250 frames per second. This allows the image receiving device to record fast-moving objects as photographic images and to store this data onto a storage medium, such as memory 20. In addition, after recording, the stored images can be played back in slow motion (manually or by way of the computing system), which can then be used by computing system 30 to measure strain and/or displacement, which will also be discussed more below. As is noted above, this can include the computing system factoring in an image angle for when optical device 12 and/or receiving device 16 is at an angle.

In that image receiving device 16 captures high definition images at high frame rates, it produces a significant amount of data that needs to be stored for data analysis; including strain and/or displacement analysis. However, only the data associated with the testing procedures and/or hammer blows of the installation operation is needed for data analysis. According, system 10 can further include an activation sensor 74 that prompts the system to store data. Activation sensor 74 can use a wide range of technology to determine the data needed for analysis. As is shown in FIG. 1, sensor 74 could be attached relative to the object being tested wherein vibration and/or movement could be used to determine when data is needed or collected. As can be appreciated, when 74 detects vibration or movement, it could provide the data needed to let system 10 know when to store images. And, this can even include data obtained before the vibration or movement is detected. In certain embodiments, this could be instructions to save data or images for a first time period before the detection and a second time period after the detection wherein data can be collected during a set time and the set time can be a set time before and/or after activation. The set time can be under 5 seconds. In another embodiment, the set time is under 3 seconds. This could include saving data five seconds before and five seconds after any detected movement. In that sensor 74 is merely a movement detector, it can be quickly attached to structural object SO and it is not a sensitive piece of equipment. For example only, a strap 75 could secure sensor 74 to structural object SO. However, in another set of embodiments, sensor 74 could be a sound sensor, or the like, that could be a part of optical device 12 and/or a stand alone sound detection unit and/or vibration sensor (see FIG. 5) that detects the sound and/or vibration associated with the hammer blow and/or testing of the structural object. Thus, as with the rest of system 10, sensor 74 also could be a non-contact component to prevent the need to attach any equipment directly to the object being tested. If sensor 74 is a stand alone unit, it could be in wired and/or wireless communication with optical device 12, computing system 30 and/or computing system 40. In the embodiment shown in FIGS. 1 & 5, sensor 74 includes an antenna 80 that is in wireless communication with optical device 12 by way of antenna 82; however, a wired connection could be used. These additional systems could greatly reduce the memory storage requirements in that the stored images would only be those relating to the hammer blow, load application and/or test procedure. Moreover, the operations for selective data acquisition could be done automatically. As can be appreciated, this could also be done manually by way of only activating system 10 during the actual test procedure.

Figure 6A:
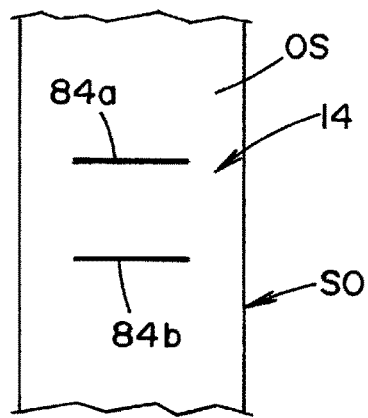
FIGS. 6A-6F show several different types of marked images.
Figure 6B:
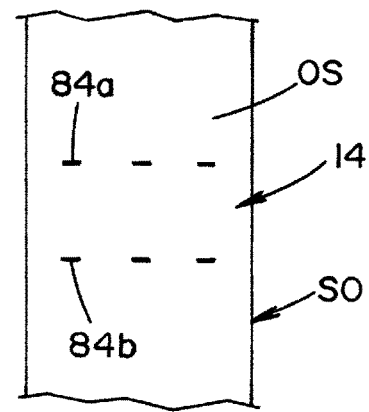
Figure 6C:
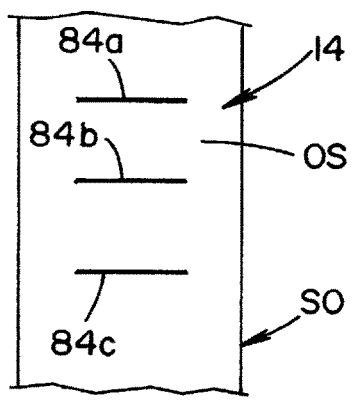
Figure 6D:
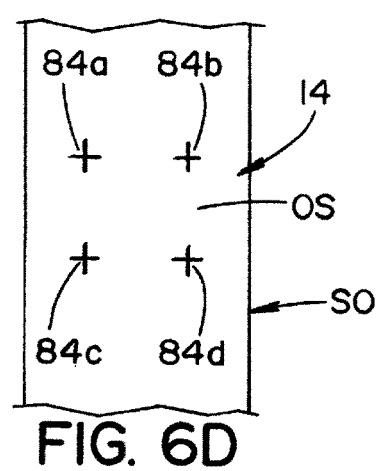
Figure 6E:
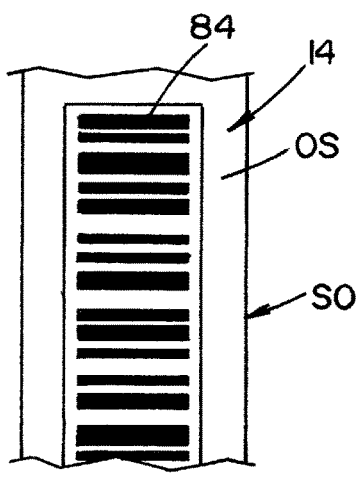
Figure 6F:
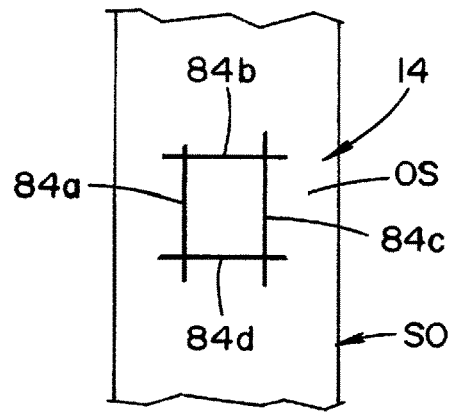

As discussed above, system 10 includes one or more image arrangements 14 that are fixed relative to structural object SO. These can be any images on structural object 10 including, but not limited to, images printed directly on an outer surface OS of structural object SO, images fixed relative to structural object SO, images formed in an outer surface OS of structural object SO. Moreover, the images can be marked by any marking method. This can include, but is not limited to, painted images, printed images, images cast into the structural object, an object or image cast onto the structural object, templates cast into the structural object, stickers, labels, tape, adhesive sheets, marked or unmarked objects fixed to the structural object, and/or surface features on the object itself and/or formed into the object itself. Essentially, any image can be used in connection with structural object SO without detracting from the invention of this application wherein FIGS. 6A-6F show examples of such images; however, this should not be considered an exhaustive list. Further, the image arrangement could be a single image arrangement or multiple image arrangements. In this respect, the image arrangement 14 could be a single image arrangement marked on one side of the structural object and/or multiple image arrangements 14 circumferentially spaced about the structural object. Yet further, the images could be multiple images (or one long image) along the length or along object axis SA of the structural object to allow testing through some or all of the installation process. Or, the image and/or the testing could be focused on the final portion of the drive and/or can include testing after installation. However, as can be appreciated, the invention of this application allows for the installer to easily and inexpensively test during any part of the installation phase and/or during any part of testing phase. As is shown in FIGS. 6A-6F, the image arrangements 14 includes one or more image elements 84 that can be in the form of lines (horizontal and/or vertical), dots, graphs, bar graphs, dashes, bar codes grids, and/or could be a surface texture or texturing in the material surface itself with no markings, like how an optical mouse functions. The images shown in FIGS. 6A-6F show several examples of image arrangements 14. FIG. 6A shows an image arrangement 14 having image elements 84a and 84b that are in the form of lines. FIG. 6B shows an image arrangement 14 having image elements 84a and 84b that are in the form of dashed lines. FIG. 6C shows an image arrangement 14 having three image elements 84a, 84b and 84c that are in the form of lines. FIG. 6D shows an image arrangement 14 having four plus sign image elements 84a-84d. FIG. 6E shows an image arrangement 14 similar to a barcode arrangement that includes a plurality of lines 84 and lines having different thicknesses. FIG. 6F shows an image arrangement 14 having a cross hatch arrangement with four image elements 84a-84d wherein image elements 84a and 84c are vertical and image elements 84b and 84d are horizontal. Again, this is intended to be examples only wherein these examples are not an exhaustive list wherein a wide range of image and/or image elements could be used without detracting from the invention of this application. Moreover a wide range of image transition elements could be used when long images extend down the structural object, such as is shown in FIG. 6E. During operation, the image arrangement(s) 14 that are monitored by system 10 are the images 14 that are within a visual range 100 of the system. Images 14 outside visual range 100 will not be monitored for movement until the movement of the structural object and/or the system moves them into visual range 100 and/or device 12 is adjusted to move them into the visual range. Referenced above are examples of the ways for optical device 12 to track with images 14 to allow the system to track the installation of the structural object during a wider range of the installation, which will be discussed more below. Visual range 100 is typically a function of a field of view 102 of the image receiving device and an optical spacing 104 between images(s) 14 and image receiving device 16. According to one set of embodiments, field of view 102 can be adjustable to allow image receiving device(s) 16 to limit the data to a desired set of images 14. Similarly, optical spacing 104 can also be adjusted and/or adjustable wherein different types of image receiving devices 16 can require different optical spacings for maximum accuracy and/or performance. As can be appreciated, inadvertently viewing multiple images could provide false data; however, as will be discussed more below, images can be configured to reduce false data, such as with the use of transitional images. In embodiments that include light emitting device 18, the system includes a light spacing 106 between light emitting device 18 and image arrangement 14, which will be discussed more below.

Image receiving device(s) 16 is configured to detect movement in image arrangement(s) 14 and/or the image element(s) of image arrangement(s) 14 during and/or after an event; such as during and/or after a hammer blow, and/or during and/or after a structural test, which will be discussed more below. This observed movement is for movement of the entire image arrangement 14 (displacement) and/or for relative movement of two or more image elements within the image arrangement (strain). In this respect, the system can detect the spacing between two image elements in image arrangement 14 and how these two image elements move or compress relative to one another. These results of relative movement between multiple image elements in image arrangements 14 can be used to determine or calculate strain in the structural object at or near visual range 100 while the movement of one image element of the image arrangement 14 or the entire image arrangement could be used to determine or calculate bearing capacity of the structural object and/or hammer performance.

Figure 2A:
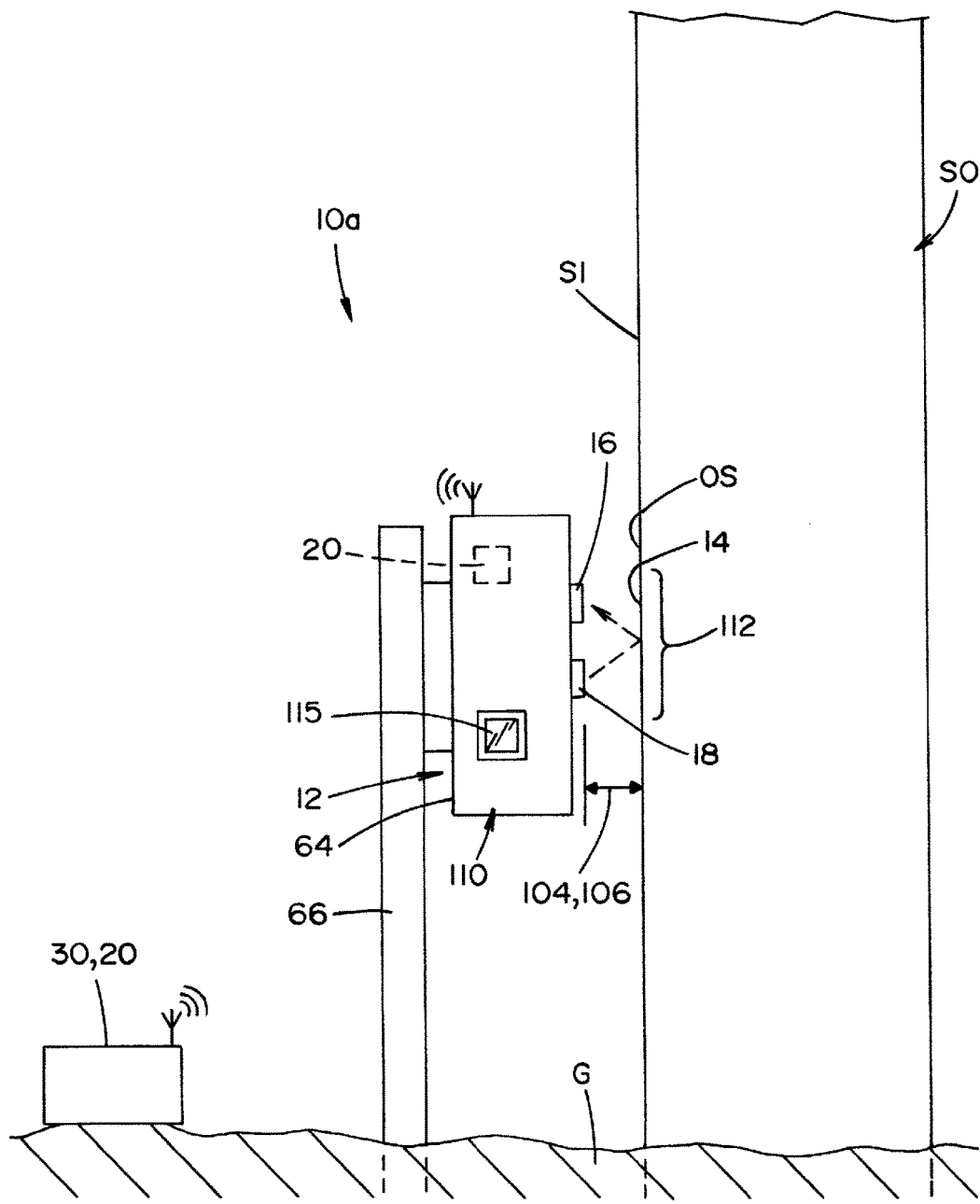
FIG. 2A is an elevational view of a structural object, such as a pile structure, showing certain aspects of another embodiments of the non-contact strain sensor system according to certain other aspects of the invention of this application.
Figure 2B:
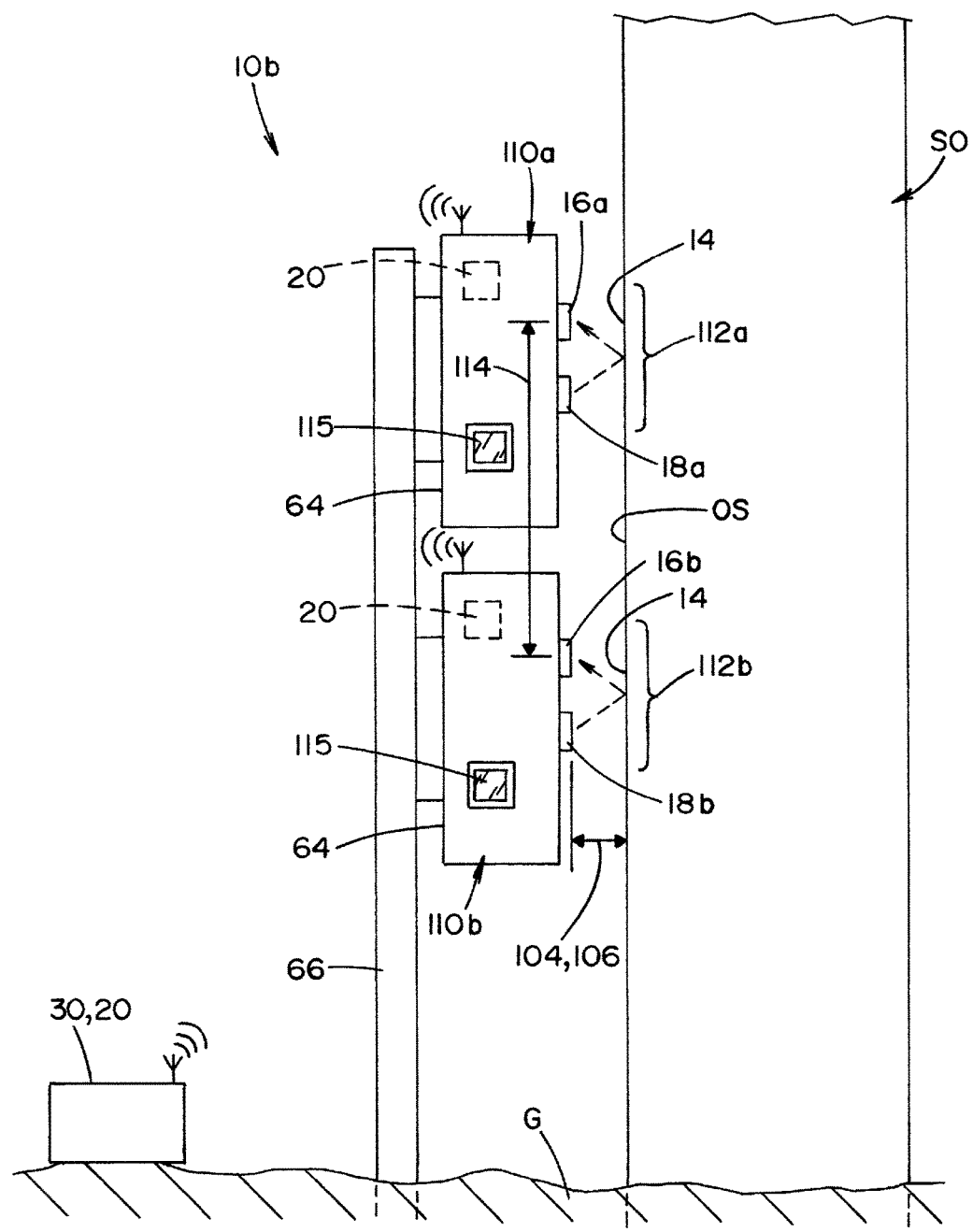
FIG. 2B is an elevational view of the structural object shown in FIG. 2A showing a similar embodiment as is shown in 2A that includes two optical devices.

Depending on the type of image receiving device 16 being used and/or the natural light at the test site, one set of embodiments further includes one or more light emitting devices 18. As discussed above, light emitting device 18 can produce the light for the image to be tested (FIG. 2) and/or can enhance natural light for low light conditions or create the needed light (FIG. 1). When light emitting device 18 is used to produce the light for the image detection, light emitting device 18 can include a laser or other light that is reflected off a surface of the structural object. The reflected light can be used to therefore detect movement of the structural object. In these sets of embodiments, optical spacing 104 and light spacing 106 can be drastically reduced. With special reference to FIGS. 2A and 2B, shown are systems 10a and 10b, respectively. In greater detail, FIG. 2A shows a system 10a that includes a single optical device and/or image receiving device 110 that has a visual range 112 that covers image 14. Optical device and/or receiving device 110 includes an image receiving device 16 and includes light emitting device 18 wherein light emitting device 18 produces the light for the image to be viewed by device 16 wherein a surface texture could be used to detect movement of the image elements of image 14; however, this is not required. Even though device 110 has a much smaller optical spacing 104 and light spacing 106, device 110 is still spaced from structural object SO and is a non-contact system. In the embodiments shown in FIG. 2A, device 110 is a single device that includes a visual range 112 that covers at least one image element of image 14. For all embodiments of this application, the optical device and/or image receiving device can include a visual display and/or data entry arrangement 115. In the embodiment shown, display and/or entry unit can be used to align device 110 relative to image 14, enter data, enter commands, initiate testing, review data and/or review test results, or the like. As is shown in FIGS. 2A and 2B, visual display and/or data entry arrangement 115 can be attached to device 110. However, visual display and/or data entry arrangement 115 can also be an external unit as is shown in FIG. 1 and can be in wireless communication and/or in wired communication with optical device 12 and/or image receiving device 16 or computer systems 30 and/or 40.

FIG. 2B shows a similar embodiment wherein light emitting device 18 produces the light for the image to be viewed by device 16. In this respect, FIG. 2B shows an example of a system 10b that includes two optical devices and/or image receiving devices 110a and 110b that have visual ranges 112a and 112b, respectively, that each cover a separate image element of a common image 14 and/or two different image elements. The two image receiving devices 16a and 16b can be space from one another by a known spacing 114 wherein the images/data produced by the two optical devices can then be used to calculate both movement and strain. Each optical device and/or image receiving device 110a and 110b includes a light emitting device 18a and 18b, respectively. Again, each device can work in the same way as device 110 in FIG. 2A, but two units are configured to work together and detect movement of two image elements that can be from a single image 14. Then, the data of the two units can be combined to determine and/or calculate the strain and/or displacement at single image 14. While not shown, a modified system could include a single light emitting device 18 with two or more optical devices and/or image receiving devices 110. In addition, the optical spacing 104 and/or light spacing 106 of system 10*a* can be greater than optical spacing 104 and light spacing 106 of system 10*b* to allow for the increased visual range 112 of system 10*a* that views both image elements of the image 14 in FIG. 2A.

Figure 3A:
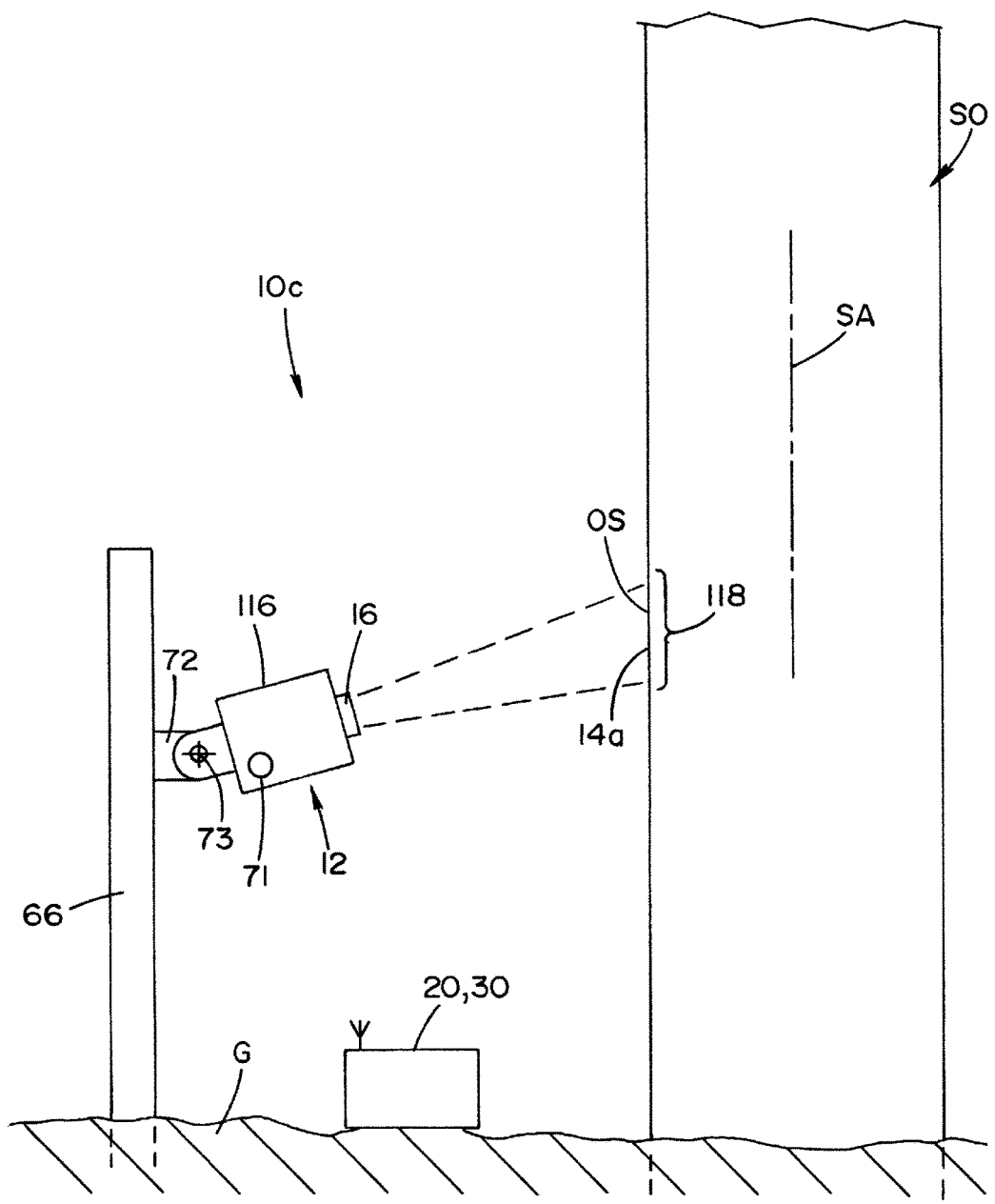
FIG. 3A shows a non-contact strain sensor system according to certain aspects of the invention of this application wherein the structural object is in a first position.
Figure 3B:
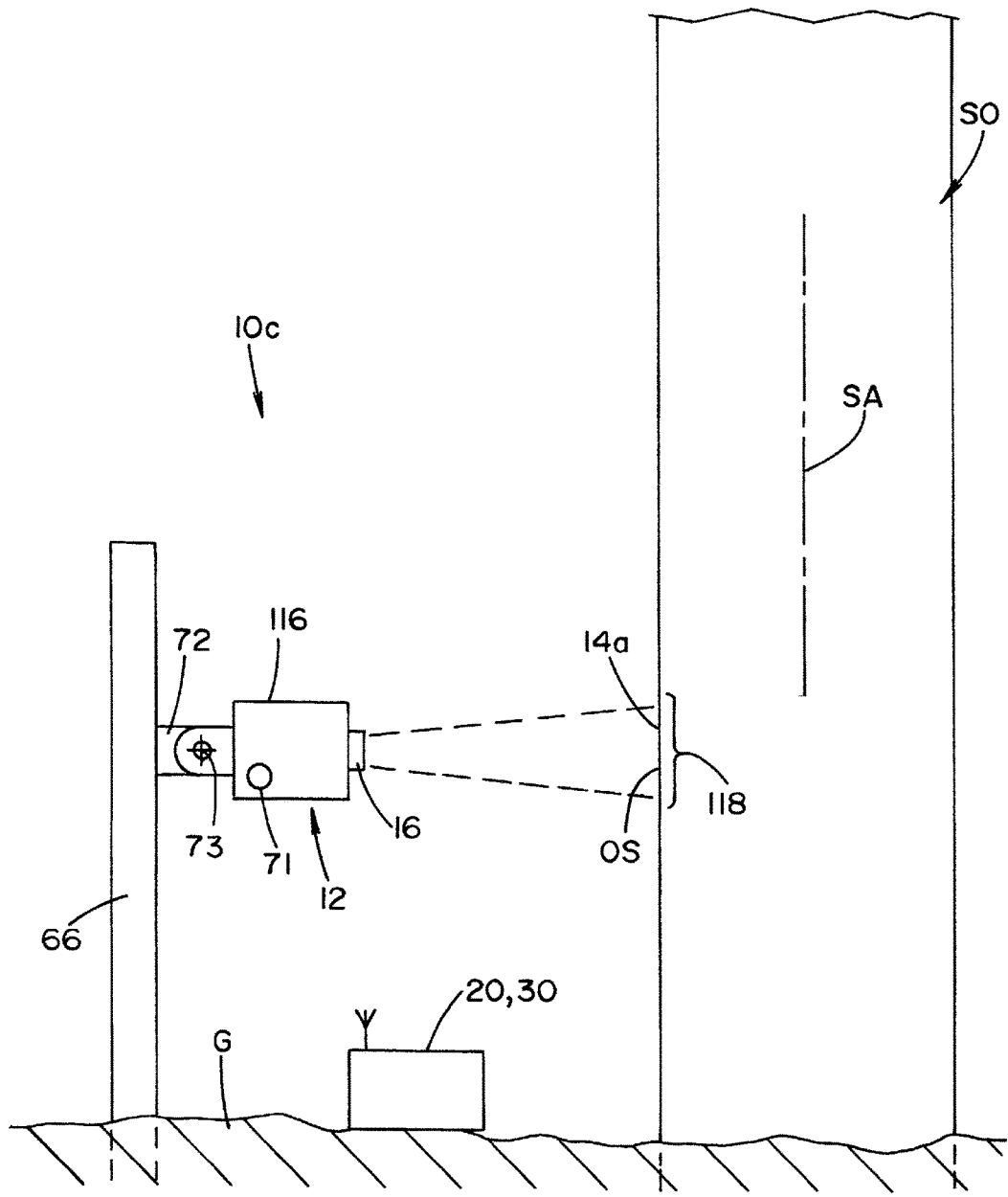
FIG. 3B shows a non-contact strain sensor system of FIG. 3A wherein the structural object is in a second position.
Figure 3C:
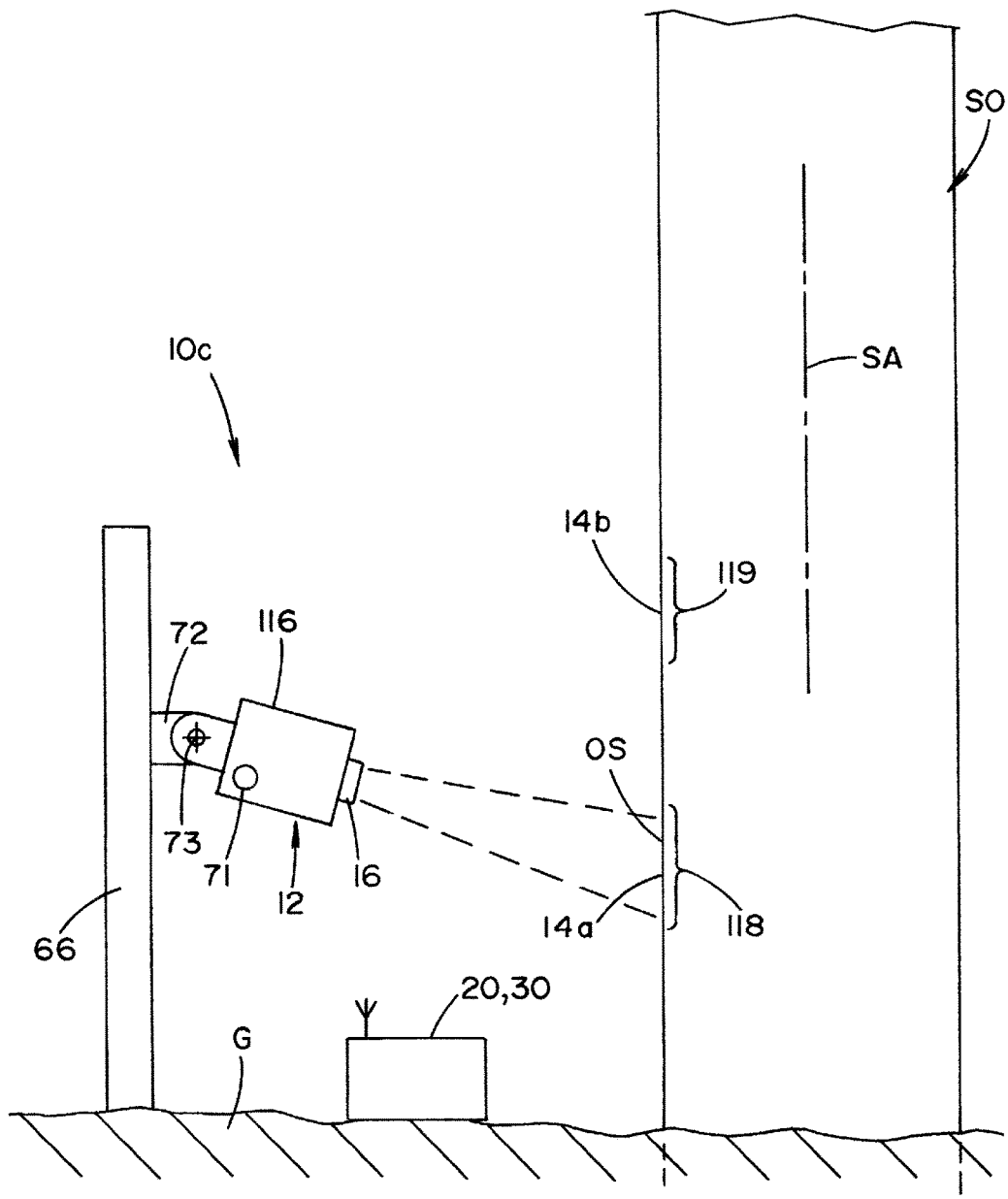
FIG. 3C shows a non-contact strain sensor system of FIG. 3A wherein the structural object is in a third position.
Figure 3D:
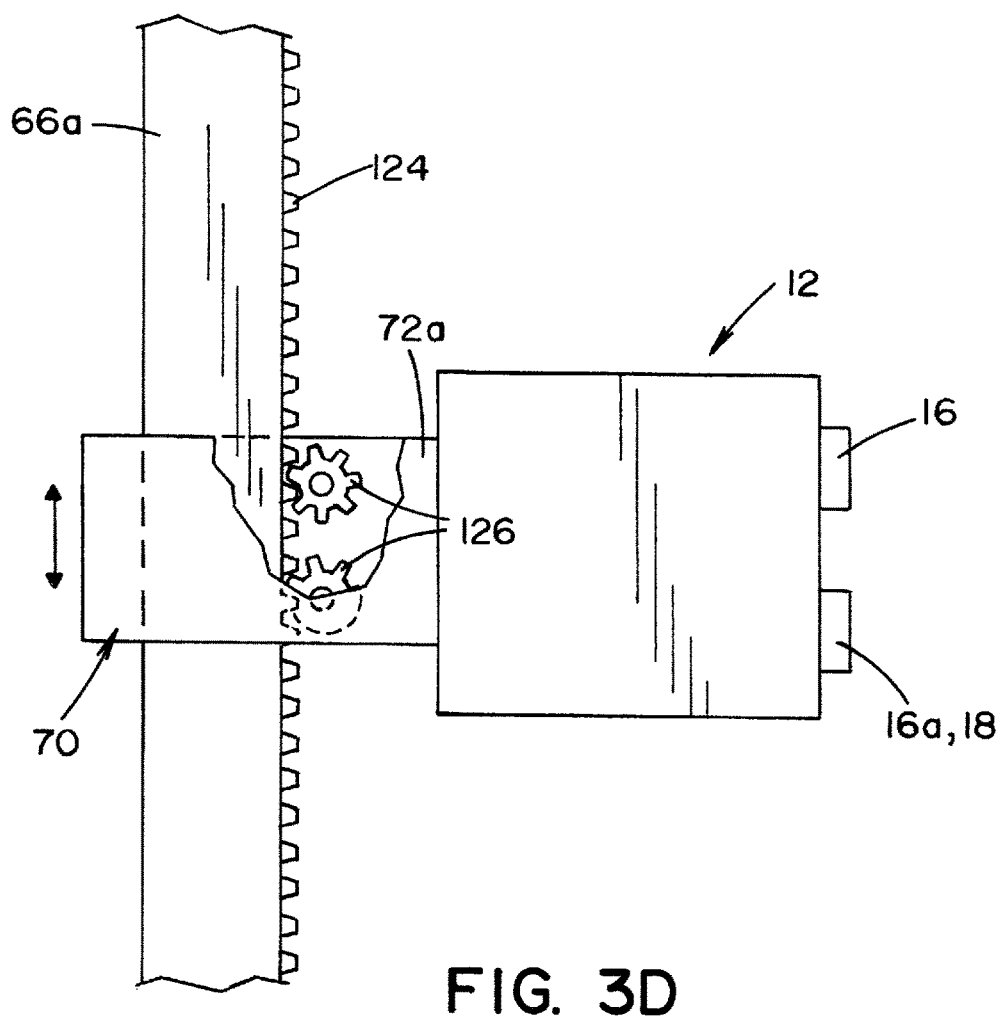
FIG. 3D shows a non-contact strain sensor system having a linear motion support.

With special reference to FIGS. 3A-3D, shown are one of the uses of adjustable support arrangements to allow the system to follow image 14 and/or adjust the system relative to image 14. FIGS. 3A-3C show pivotable mounts or support 72 for optical device 12 and/or image receiving device 16. In greater detail, FIGS. 3A-3C show a system 10*c* that includes a single optical and/or image receiving device 116 with a visual range 118. However, it is noted that more than one unit could be used wherein the example in these figures is not to be limiting toward the invention of this application. As noted above, optical device(s) 12, image receiving device(s) 16 and/or light emitting device(s) 18 can include a pivotable support 72 to allow optical device(s) 12, image receiving device(s) 16 and/or light emitting device(s) 18 to follow arrangement(s) 14 during installation as image(s) 14 move downwardly. Pivotable support 72 can be connected between support structure 66 and device 16. As is also discussed above, the pivotable device can be manual and/or automatic wherein the system can include an angle sensor 71 to detect the angle of optical device(s) 12, image receiving device(s) 16 and/or light emitting device(s) 18 and data from angle sensor 71 can be used to allow the system to allow for the automatic control the test angle. This arrangement can be used to extend the range of the system and/or improve accuracy. These figures show the use of pivotable support 72 to extend the range of the system wherein all of the figures show the same structural object SO and the same image 14, but show the image 14 as it moves downwardly during the installation process of structural object SO, such as during the hammering of a structural pile. And, while these figures show the pivotable arrangement in connection with the overall housing structure, any of the pivotable arrangement of this application could be utilized according to this set of embodiments.

FIG. 3A shows structural object SO and image 14 at a first point during the installation process. FIG. 3B shows structural object SO and image 14 at a second point during the installation process. FIG. 3C shows structural object SO and image 14 at a third point during the installation process. In FIG. 3A, optical and/or image receiving device 116 is pivoted about optics axis 73 at an upward angle wherein visual range 118 is above axis 73. In FIG. 3B, optical and/or image receiving device 116 is pivoted about optics axis 73 at about a 90 degree angle relative to structural axis SA wherein visual range 118 is generally in alignment with axis 73. In FIG. 3C, optical and/or image receiving device 116 is pivoted about optics axis 73 at a downward angle wherein visual range 118 is below axis 73. This pivotable arrangement can be used by the system to track with the image 14 as it moves downwardly during installation. Moreover, the pivotable arrangement can be used to better align optical and/or image receiving devices 116 with image 14 regardless of the movement of image 14. In addition, image data and data from sensor 71 can be used to allow the system to automatically adjust the optics angle and align optical and/or image receiving device 116 with image 14. Moreover, after optical and/or image receiving device 116 reaches the third point shown in FIG. 3C, the system can pivot optical and/or image receiving device 116 about axis 73 to move from image 14*a* to image 14*b* in a new visual range 119. In addition, as discussed above, the computer systems can be used to calculate the effect of the angle on the images collected and/or can control the pivot angle. Sensor 71 can be used to allow the system to automatically make this calculation.

FIG. 3D shows yet another arrangement that operate like the arrangement shown in FIGS. 3A-3C. In this respect, shown in FIG. 3D is an adjustable support 72*a* that is a linear arrangement to allow the system to follow image 14 and/or adjust the system relative to image 14. As with all of the adjustable supports, the support can be adjusted manually or automatically and/or can be adjusted mechanically and/or electronically wherein the adjustment could even be done at a remote location by the operator and/or system at remote computer 40. Support 72*a* is configured to support optical device 12 and/or image receiving device 16. As is shown, support 72*a* supports an optical device 12 that includes one or more image receiving devices 16 and/or 16*a*. In that alternative, device 12 can support both image receiving devices 16 and one or more light emitting devices 18. In greater detail, FIGS. 3A-3C show a system 10*c* that includes a single optical and/or image receiving device 116 with a visual range 118. Support 72*a* is configured to move, linearly along a support 66*a*. As is shown, support 72*a* and support 66*a* can be a rack and pinion arrangement wherein support 66*a* can include guide teeth 124 and support 72 a can include gears 126.

With special reference to FIG. 3E, yet another embodiment of the invention is shown wherein yet other technology can be used to support one or more optical devices 12 and/or image receiving devices 16, and align and/or move the system. This includes any technology currently known and technology discovered in the future that can support and maintain optical devices 12 and/or image receiving devices 16 relative to the structural object. Moreover, devices that can both support and adjust optical devices 12 and/or image receiving devices 16 relative to the structural object and/or relative to multiple structural objects at one time and/or in succession. In the example shown, one or more unmanned aerial vehicles ("UAV") could be used to support one or more optical devices 12 and/or image receiving devices 16 during the testing of a structural object, move the one or more optical devices 12 and/or image receiving devices 16 as the structural object moves, and even move the optical devices 12 and/or image receiving devices 16 between different structural objects at the jobsite.

In greater detail, shown is a system 10 UAE that can include any of the features and systems of the other embodiments of this application. As with other embodiments, some or all of the computing devices could be internal and/or some or all of the computing systems can be external wherein onsite computing system 30 can be utilized and can be specially adapted for UAE controls. Yet even further, the system can be wired and/or wireless without detracting from the invention of this application. In greater detail, system 10 UAE includes one or more optical devices 12 UAE. The optical devices include one or more image receiving devices 16. In the embodiment shown, the optical device includes two image receiving devices 16*a* and 16*b*. The optical devices further includes a frame structure 150 that supports image receiving devices 16*a* and 16*b* and can maintain image receiving devices 16*a* and 16*b* at a set spacing 152 wherein image receiving device 16*a* can view image arrangement 14*a* and image receiving devices 16*b* can view image arrangement 14*b*. The optical devices can include the use of any UAV technology and can include a flight control package 153, an isolation stage 154 and/or a fine control or lock stability package 155. Moreover, the image receiving devices 16a and 16b can be shifted downwardly relative to flight control package 153 to improve the overall balance of optical devices 12 UAE wherein there can be image receiving devices spacings 152a and 152b between image receiving devices 16a and 16b, respectively, and the flight control package 153 wherein spacing 152b can be greater than spacing 152a. Image receiving devices spacings 152a and 152b together are set spacing 152 for the image receiving devices. While not required, optical devices 12 UAE could include a wired connection 156 that can provide power to the optical device and/or provide control and/or data collection communications.

Again, the UAV technology can be any UAV technology, any flight control technology and any stabilization technology. Accordingly, flight control package 153 can have a wide range of configurations. These include, but are not limited to, a wide range of multirotor UAVs having any number of rotors including, but not limited to, tricopters, quadcopters, hexacopters and octocopters (3, 4, 6 and 8-rotor helicopters, respectively)

It is also contemplated that the optical devices 12 UAE can have multiple flight modes. Wherein the system can include a first flight mode wherein the optical device(s) is in a data collection mode and the system is set up to be stabilized and collect data as is described throughout this application. In addition, the optical device(s) can also include a second flight mode wherein the optical device(s) can move around the jobsite and position itself for collecting data in relation to a different structural object. As is known in this industry, some jobsites can include many structural objects that are to be tested wherein the second flight mode can allow the optical device(s) to move between multiple structural objects to be tested. Moreover, the optical device(s) can include a third flight mode to allow the optical device(s) to travel to the jobsite. This could be a simple movement from a delivery vehicle to the jobsite or even longer range movement of the optical device(s) to and from jobsites. Yet even further, the optical device(s) can be switched between manual modes wherein an operator can manually operate the optical device(s), preferably in only the second and/or third flight modes, but where the system takes over operation in the first flight mode. In this respect, the optical device(s) could be manually flown to the jobsite and/or between different structural objects at the jobsite and generally positioned at least near the structural object to be tested. This could be performed by the more traditional joy stick operation of UAV with the aid of one or more flight cameras 158. In other embodiments, the optical device(s) could be automatically moved into position by way of GPS data, onsite coordinates, laser tracking systems, or the like. Then, once the optical device(s) is in general position relative to the structural object to be tested, the optical device(s) can be changed to the first flight mode wherein isolation stage 154 and/or fine control stability package 155 can work with flight control package 153 to create a stable platform mode (SPM) in first flight mode to allow data to be collected. The first flight mode can also include the use of camera 158 and/or image receiving devices 16a and 16b to fine tune the alignment between the optical device(s) and the image(s) to be detected and/or as structural object moves. In SPM mode, flight control package 153, vibration or isolation mounts or stage 154 and/or fine control stability package 155 can work together and with the optical device(s) and/or camera 158 to stabilize the system and allow data to be collected. Yet even further, camera 158 and/or image receiving devices 16a and 16b can even utilized one or more visual references 160 (FIG. 1) to create a fixed reference point to help allow the operate system to maintain the stabilized position and/or to account for any movement of the system during data acquisition. The visual reference can be physical and/or electrical. While not shown, the image receiving device(s) could be mounted to frame 150 by a separate vibration or isolation mount(s) 154.

In SPM mode, the vertical and horizontal orientations of the optical device(s) could be fixed and one or more distance measuring devices 159a and/or 159b can be used to measure and/or help maintain measuring distance 104. And, in SPM mode, the optical device(s) would lock distance 104 along with locking other orientations of the system. Moreover, isolation mount(s) or stage(s) 154 can include motional slides to aid in the "fine lock" to the pile.

Yet even further, while the optical device(s) is shown to be a single system including two image receiving devices, the optical device(s) could include a separate optical device for each image receiving device.

According to yet other embodiments of the application, marking arrangement 14 can be used to extend the range of the system without adjustment. In this respect, image 14 can extend downwardly along a large portion of the structural object, like a bar code, so that once one set of lines exits the visual range another set of lines is within the visual range. Moreover, one line set to the next line set can include visual distinctions (again, like a barcode), to allow the system to detect and account for the transition from one line set to the next. This can include different line types, such as is shown in FIG. 6E, different colors, the use of other transition symbols or images that can be detected and interpreted by the system to account for the progression of image 14 as it moves during installation, such as a transitional image to provide additional movement instructions to the system.

Figure 4:
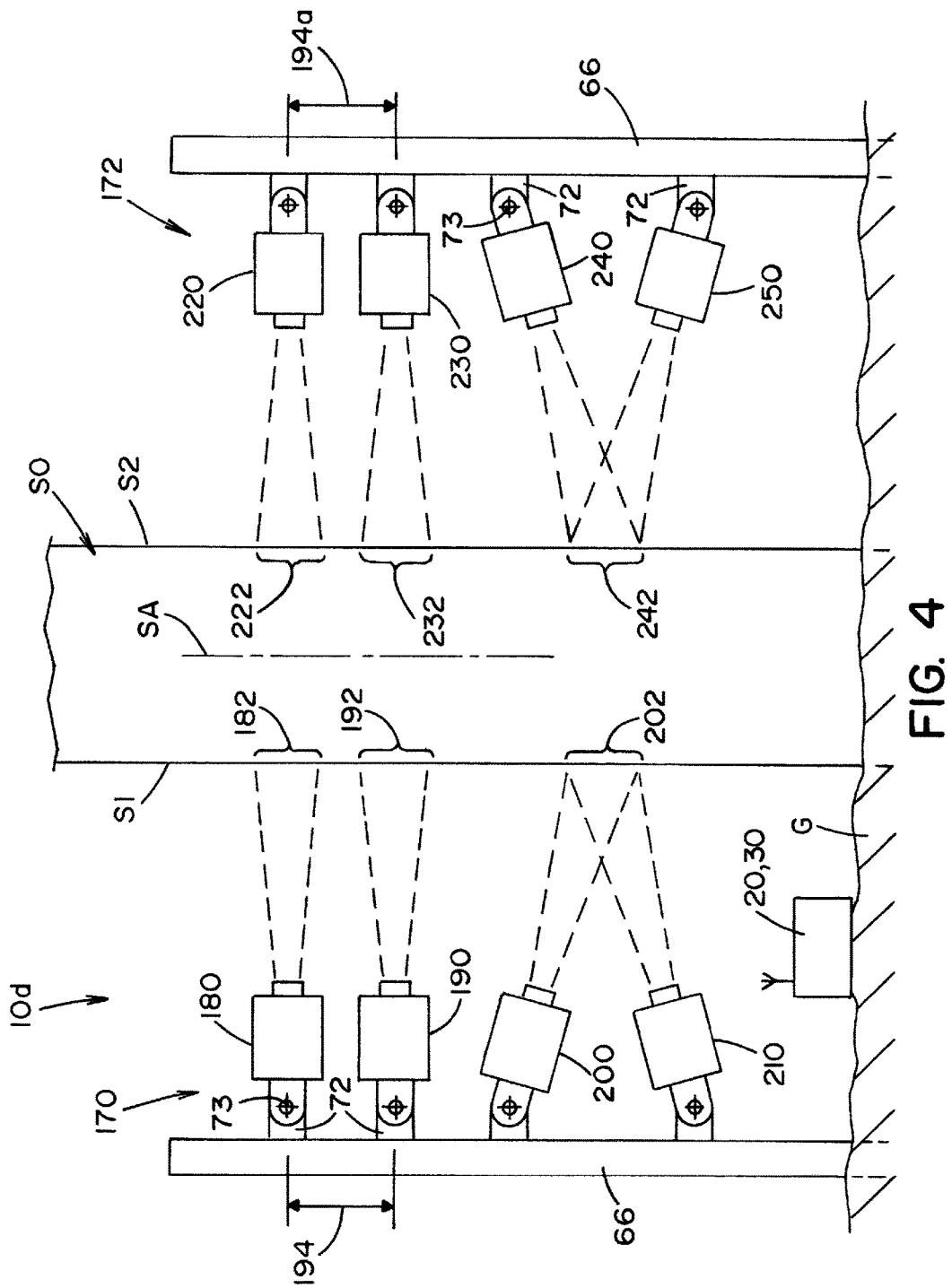
FIG. 4 is an elevational view of a structural object, such as a pile structure, showing yet other aspects of the invention wherein the non-contact strain sensor system includes multiple optical devices on two sides of the structural object.
Figure 5:
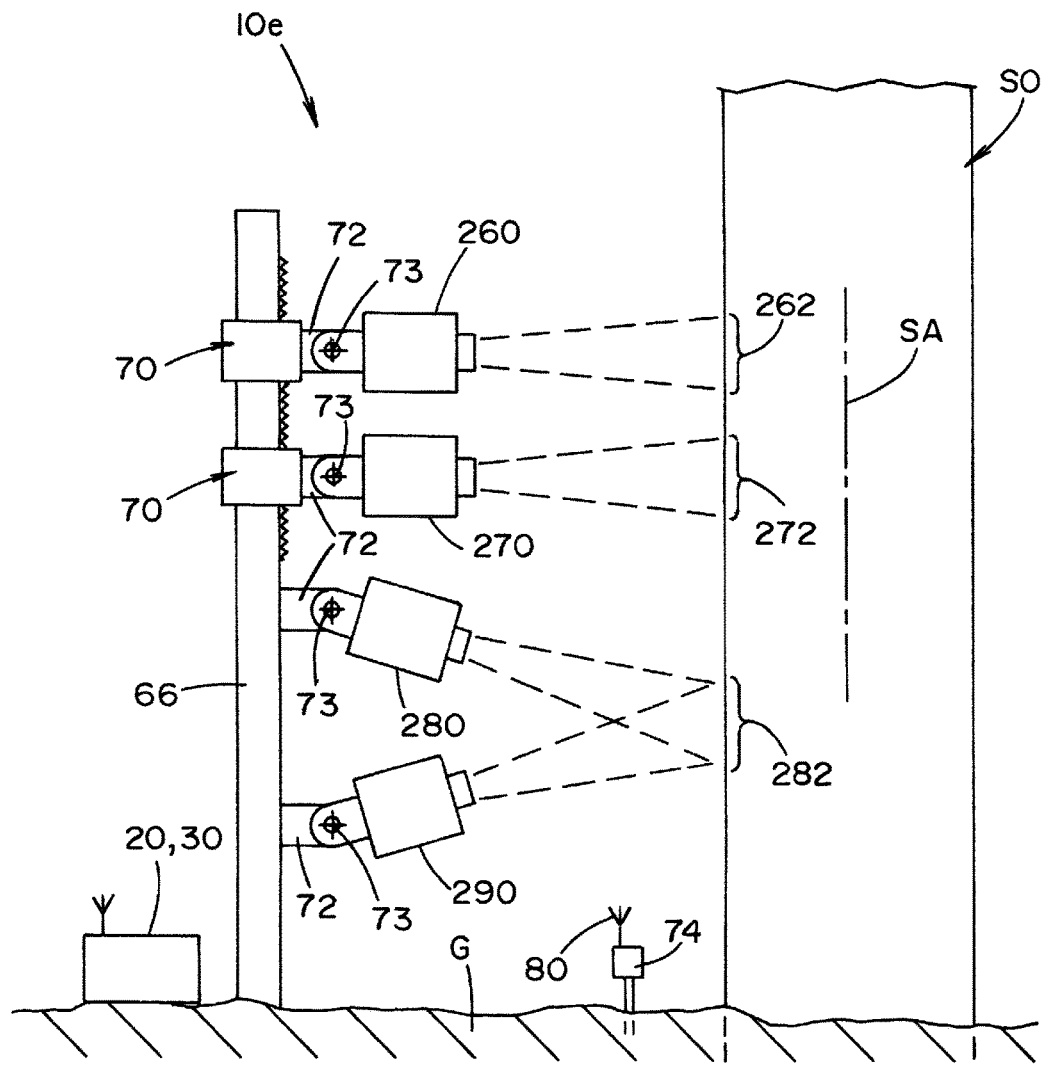
FIG. 5 is an elevational view of a structural object, such as a pile structure, showing certain other aspects of the invention wherein the non-contact strain sensor system includes multiple optical devices on one side of the structural object.

With special reference to FIGS. 4 & 5, system 10 can include more than one optical device 12 and/or image receiving device 16 to further improve the accuracies of the system and/or extend the range of the system. In this respect, as is shown in FIG. 4, system 10 could include one or more optical devices and/or image receiving devices (or sets) on two sides of the structural object and this can include one or more optical devices and/or image receiving devices having any of the features of this application. As is shown, system 10d includes a first set of optical devices/image receiving devices 170 on a first side S1 of structural object SO and a second set 172 on a second side S2 of structural object SO. The sets are being shown to describe the different types of arrangements that could be used wherein any one or all of the shown optical device/image receiving devices within the sets could be used on one or both sides. In greater detail, set 170 includes an optical device/image receiving device 180 that extends transverse to structural axis SA and has a visual range 182 and an optical device/image receiving device 190 that extends transverse to structural axis SA and has a visual range 192, which is below device/image receiving device 180 and visual range 182, respectively. Optical devices/image receiving devices 180 and 190 illustrate multiple embodiments. First, multiple devices that are vertically (or axially) spaced from one another can extend the range of the system. This can be used in addition to the other range extending arrangements of this application (pivotable mount, linear mount) and/or in addition to these other arrangements.

In addition, multiple receiving devices 180 and 190 can be used to improve accuracy. In this respect, multiple receiving devices 180 and 190 can be spaced from one another by a known image receiving spacing 194. In this respect, each optical device/image receiving device 180/190 can see or detect line or image movement of about 100 ppm (10 k pixels). This can be about 10,000 pixels over a visual range of about 10 cm, which equals about 1 µm per pixel. Movement of the image by 1 pixel is 1 µm. If two receiving devices are utilized (180 and 190) at the top and the bottom of the target image (spaced by distance 194), then 1 pixel change in distance 194 over 10 cm equals about 100 microstrain (µε), which is ε×10$^{-6}$. If two multiple receiving devices (180 and 190) are spaced by distance 194, then the strain resolution over a surface can be increased. If distance 194 equals 1 meter, and receiving device 180 detects or sees one pixel of movement while receiving device 190 detects or sees no movement, then there is one pixel movement of 1 µm over a total of 1 meter. This results in a strain resolution of 1 µm/1 meter or 1 microstrain (µε), which is 100 times more accurate. Distance 194 can be any spacing without detracting from the invention. As discussed above, spacing can be 1 meter. In other embodiments, spacing 194 is less than 2 meters. In another set of embodiments, spacing is less than 1 meter. In yet another, it is less than 0.5 meters. In a further embodiments, it is greater than 0.1 meters.

In yet other embodiments, multiple receiving devices can view the same image or image set. In this respect, the system can include an optical device/image receiving device 200 that extends at a downward angle relative to structural axis SA and has a visual range 202 and an optical device/image receiving device 210 that extends at an upward angle relative to structural axis SA and also has visual range 202 wherein both optical device/image receiving devices 200 and 210 will analyze the same visual range. Similarly, the optical spacing could be adjusted such that at least part of visual range 202 overlaps. This can be used for redundancy to ensure that data is accurately collect, to separately view different image elements in a single image as reference above, and/or to perform separate test function relating to the same image.

System 10*d* further includes second set 172 that has an optical device/image receiving device 220 that extends transverse to structural axis SA and has a visual range 222, an optical device/image receiving device 230 that extends transverse to structural axis SA and has a visual range 232, an optical device/image receiving device 240 that extends at a downward angle relative to structural axis SA and has a visual range 242 and an optical device/image receiving device 250 that extends at an upward angle relative to structural axis SA and also has a visual range 242 wherein both optical device/image receiving devices 240 and 250 will analyze and obtain data from the same visual range.

Again, optical devices/image receiving devices 220 and 230 illustrate how multiple devices can extend range and improve accuracy by utilizing known spacing 194*a* as is discussed in greater detail above. Moreover, optical devices/image receiving devices 240 and 250 illustrate how multiple devices can improve accuracy by adding redundancy to the data collection. In addition, having devices on two sides of the structural object also increases accuracy and provides more data for the structural analysis. Moreover, by collecting data on both sides of the structural object, the system can be used simultaneously to determine whether one side of the structural object is being strained more than the other side and/or whether there is more movement on one side than the other side. As can be appreciated, this can be a sign of a bending in the structural object caused by a non-uniform hammer blow and/or a defect on one side of the structural object. As noted above, once the applied load is concluded, there can be a relaxing of the structural object and further movement of the image elements both overall and relative to one another. If the relaxing on one side remains unequal to the relaxing on the other side, it could be a sign of localized damage to the structural object on one side of the object.

As can be appreciated, these two systems can be positioned on opposite sides of the structural object. In addition, the system can include more than two optical device 12 and/or image receiving device 16 as is shown, but this is not required. Moreover, the system can include more than two sets, such as a system (not shown) that includes four units or sets generally each spaced circumferentially by 90 degrees about structural axis SA.

Similarly, and with reference to FIG. 5, the multiple optical devices 12 and/or image receiving device 16 and/or sets could be used on a single side of the structural object. Again, this can be used to extend the range of the overall system, add redundancy and/or improve accuracy. And, as with the embodiments discussed above, this can be used in addition to, or in combination with, pivotal joints 72 and/or vertical extension arrangements 70 and/or 72*a* discussed above. The embodiment in FIG. 5 shows a system 10*e* that includes an optical device/image receiving device 260 that extends transverse to structural axis SA and has a visual range 262, an optical device/image receiving device 270 that extends transverse to structural axis SA and has a visual range 272, an optical device/image receiving device 280 that extends at a downward angle relative to structural axis SA and has a visual range 282 and an optical device/image receiving device 290 that extends at an upward angle relative to structural axis SA and also has a visual range 282 wherein both optical device/image receiving devices 280 and 290 will analyze and obtain data from the same visual range. Again, while this figure shows four devices, that is not required wherein more or less than four devices could be used without detracting from the invention and wherein these are more illustrative of the types of arrangement that are contemplated. Moreover, the embodiments shown in FIGS. 4 & 5 can include any feature and/or embodiment of this application without detracting from the embodiments shown in these figures. Accordingly, these figures, and others, are intended to be illustrative and not limiting to the invention of this application Again, multiple optical devices 12 and/or image receiving device 16 can be used to improve accuracy and/or range. These multiple units can be sets and/or individual units and can include longitudinally or axially spaced units and/or pivotable units. Moreover, they can include units that are axial displaceable to allow either easy manual axial displacement and/or automatic (computer controlled) displacement. For range, the two or more units can be axially spaced relative to object axis SA along a length of structural object SO to broaden the duration of the test without adjustment and/or improve accuracy. For the pivotable devices, the optical devices 12 and/or image receiving device 16 can be manually and/or automatically pivoted to follow image 14. Or, a component of optical devices 12 and/or image receiving device 16 can be manually and/or automatically pivoted or axially aligned to follow image 14. Again, this can be used to increase the duration in which one of the images 14 can be used for the testing during installation. When pivoting is used, one or more of the computing systems can be used to adjust the data based on the angle of the pivoted optical devices 12 and/or image receiving device 16.

Again, system 10 could be used during any part of the driving process for a driven pile. This includes, but is not limited to, during entire drive, the final drive portion and/or testing after driving during a restrike. As can be appreciated, if being used for the entire drive, the images would need to be along a greater portion of the length of the structural object being driven. For drilled and cast piles, it would be limited to testing after pouring and sufficient curing. Yet further, the system of this application could be quickly and easily used for structural testing at a later date, after set up, to allow the soil to set up more about the structural object. And, this delayed testing can provide better test results more indicative of actual load bearing capacity.

The system works by analyzing the images obtained by image receiving device(s) 16 to track how the image elements of the image arrangement 14 move, extend and/or compress relative to one another during the test and/or hammer blow and after the hammer blow. It has been found that this data can be used to calculate the strain in the structural object, the performance of the hammer blow and/or the load bearing capacity of the structural object.

Figure 7:
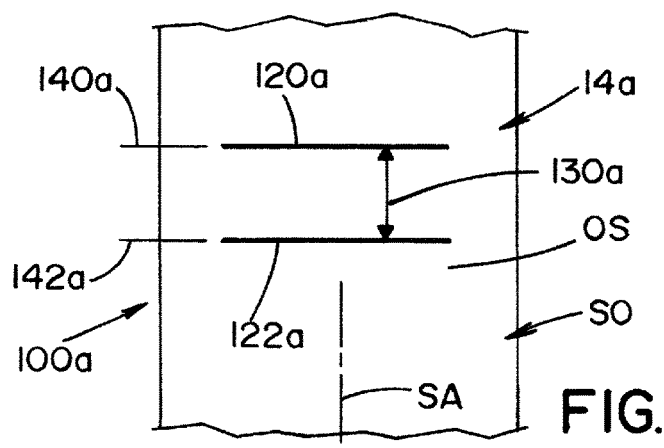
FIG. 7 is an enlarged elevational view of a marked image 14a shown in FIG. 1 before a structural object is hit by a hammer blow.
Figure 8:
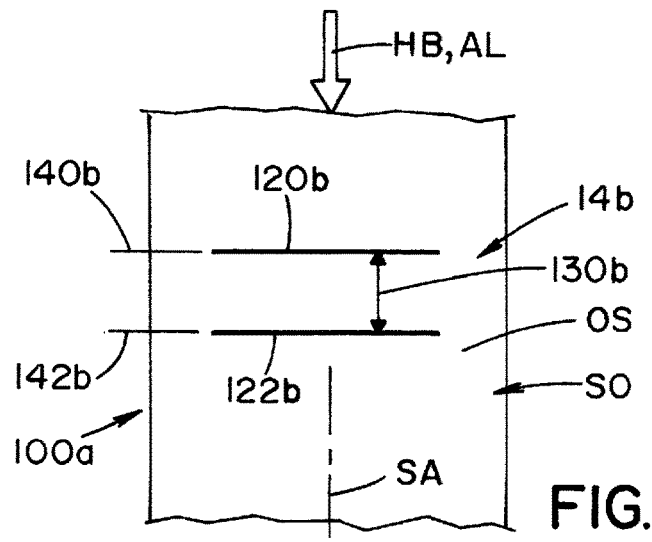
FIG. 8 is an enlarged elevational view of the marked image 14b during the load application.
Figure 9:
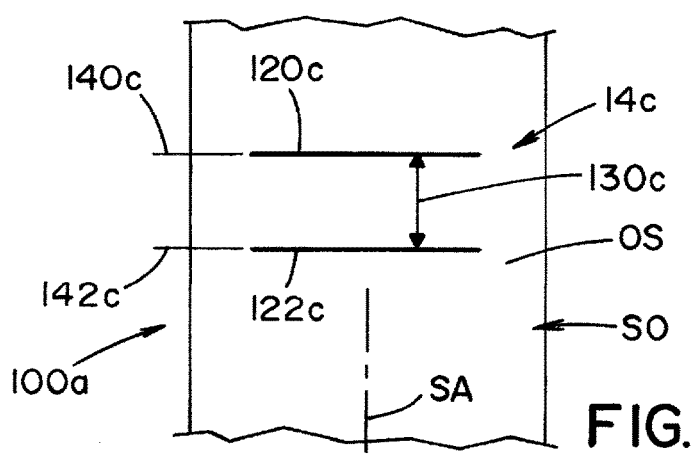
FIG. 9 is an enlarged elevational view of yet another marked image 14c after the load application.

With special reference to FIGS. 7-9, shown is visual ranges 100a that includes image arrangement 14. In this respect, FIG. 7 shows an image arrangement 14a of image arrangement 14, which is shown before a hammer blow HB and/or applied load AL is applied to structural object SO. FIG. 8 shows the same image arrangement during the hammer blow and/or applied load against structural object SO (14b). FIG. 9 shows the same image arrangement after the hammer blow and/or applied load against structural object SO (14c). The image arrangement in all of these figures includes a first image element 120, which is a horizontal line and a second image element 122, which is also a horizontal line wherein image element 120 is longitudinally spaced from image element 122 and above image element 122 along structural axis SA. Again, any type of image element could be used wherein this is an example only. First and second image elements 120 and 122 are spaced by an image spacing 130. First image element 120 is at a location 140 on structural object SO and second image element 122 is at a second location 142 on structural object SO. Optical device(s) 12 and/or image receiving device(s) 16 record the specific locations of image elements 120 and 122 during the hammer blow process and/or applied load and can be utilized to determine how the image elements move relative to one another and move overall. And, as is discussed in greater detail above, a single device can monitor both image elements 120 and 122 and/or separate and spaced optical device(s) 12 and/or image receiving device(s) 16 can each measure a separate image element wherein spacing 194 would be generally equal to image spacing 130

In greater detail, and with respect to a hammer blow for a driven pile, FIG. 7 shows image 14a before hammer blow HB and the location and relative position of image elements 120a and 122a before the hammer blow. Then, when a driven pile is hit by a pile driving hammer (not shown), the entire pile will move downwardly into ground layer G (not shown in these figures) and FIG. 8 shows image elements 120 and 122 in positions 120b and 122b during hammer blow HB. Image elements 120 and 122 have moved together from locations 140a and 142a to locations 140b and 142b. In addition, image element 120 can move relative to image element 122 wherein image spacing 130b can be less than 130a and/or greater during a portion of the duration of the hammer blow. In this respect, these figures show image 14 at a given time or instant during the hammer blow and is intended to show a maximum movement during the hammer blow. However, there will be movement of the pile and the image elements over a given period of time wherein during this duration of time image spacing 130 can change wherein during a first portion of the duration, image spacing 130b may be less than image spacing 130a and during a second portion of the duration image spacing 130b may be greater than 130a. The maximum change in spacing between image spacing 130a and spacing 130b can be used to calculate the maximum strain in the pile during the hammer blow. The changes of spacing during the entire duration of the hammer blow can also provide data on the effects or efficiency of the hammer blow on the structural object. During each of these data samples of the hammer blow, optical device 12 and/or image receiving device 16 can take at least around 250 frames or samples per second, which allows the system to show detailed movement of image elements 120 and 122 during the entire duration of the hammer blow process. This detailed data can also be compared to the change in location for positions 140a and 142a to positions 140b and 142b, respectively. Movement of any one image element during hammer blow HB during the duration of time can determine the displacement of the structural object as a function of time, and by differentiation the velocity versus time. The velocity and strain versus time can be used to determine the capacity of the structural object and hammer performance. Once hammer blow HB is completed, there will be a relaxing of the pile and further movement of the image elements overall and/or relative to one another. At the conclusion of hammer blow HB and the relaxing of the pile, if image spacing 130c remains the same as image spacing 130a, there has been no permanent damage to the pile. However, if there is not a return to the original spacing (130a), there could be a certain amount of structural damage. Further, the overall change in the locations for 140c and 142c from 140a and 142a can help determine hammer performance and/or bearing capacity. Yet further, this change can also provide information on the "set per blow" which is further useful to determine driving criteria.

Similarly, the same test can be done on other structural objects after the installation of the structural object to, for example only, test the structural object after completion and/or determine bearing capacity of the structural object. In this respect, and with reference to FIGS. 7-9, FIG. 7 shows image 14a before an applied load AL and the location and relative position of image elements 120a and 122a before applied load AL is applied against structural object SO. The applied load can be any applied load known in the art including, but not limited to, impact loads, static loads and/or dynamic loads. In these figures, applied load AL is being applied downwardly, but this is not required. Applied load AL is then applied to structural object SO and this applied load can create movement in the structural object and/or strain within the structural object. For movement, it would be downwardly in this example since applied load AL is a downward load. Thus, structural object SO is urged downwardly with reference to these figures and for illustrative purposes only. FIG. 8 shows image elements 120 and 122 in positions 120b and 122b during the application of the applied load. Again, the applied load creates movement, or can create movement, over a duration of time. And the load can be provided over a duration of time wherein FIG. 8 merely shows the position of image elements 120 and 122 (and the movement thereof) at a given point in time within the duration and not necessarily for the entire duration of the applied load. As with the example above, this can be the maxim movement during the duration wherein there can be a compression of the structural object and then a subsequent relaxing of the structural object with movement of the image elements during this entire process. FIG. 8 shows, at the given time, the image elements have moved from locations

140*a* and 142*a* to locations 140*b* and 142*b*. In addition, image element 120 can move relative to image element 122 wherein image spacing 130*b* can be unequal to 130*a* wherein, for example only, image spacing 130*b* can be less than image spacing 130*a* during a first time interval and can be greater than image spacing 130 during a second time interval. The changes in image spacing between image spacing 130*a* and image spacing 130*b* can be used to calculate the strain in the structural object during the application of the load. During each of these data samples of the application of the applied load, optical device 12 and/or image receiving device 16 can take a high number of frames or samples per second, which allows the system to show detailed movement of image elements 120 and 122 during the entire duration of the load application. And, this detailed data can also be compared to any changes in location for positions 140 and 142. Movement of any one image element during the application of the load can determine the bearing capacity the structural object as a function of time, and by differentiation the velocity versus time. The velocity and strain versus time can be used to determine the capacity of the structural object and other parameters relating to the structural object. Once the applied load is removed, there will be a relaxing of the structural object and further movement of the image elements both overall and relative to one another, which was mentioned above with reference to the second time interval. At the conclusion of the applied load, if image spacing 130*c* remains the same as image spacing 130*a*, there has been no permanent damage to the structural object. However, if image spacing 130 does not return to the original spacing 130*a*, there could be a certain amount of structural damage. Further, the overall change in the locations for 140*c* and 142*c* from 140*a* and 142*a* can help determine bearing capacity. Thus, the system can be used to monitor the strain in the pile, the bearing capacity of the pile and/or the hammer performance.

Figure 10:
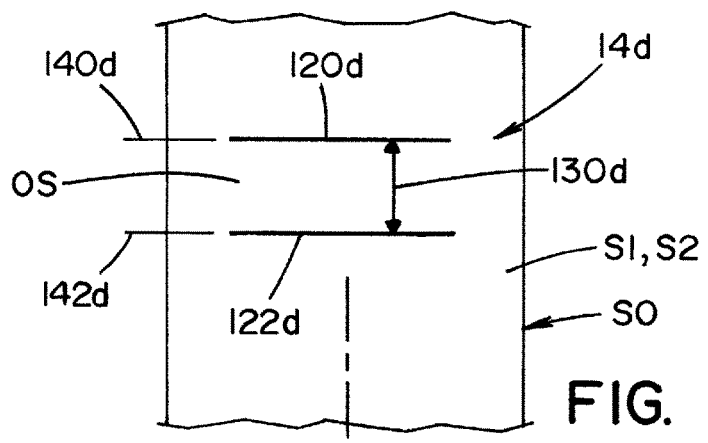
FIG. 10 is an enlarged elevational view of a marked image 14d shown in FIG. 1 before a structural object is loaded.
Figure 11:
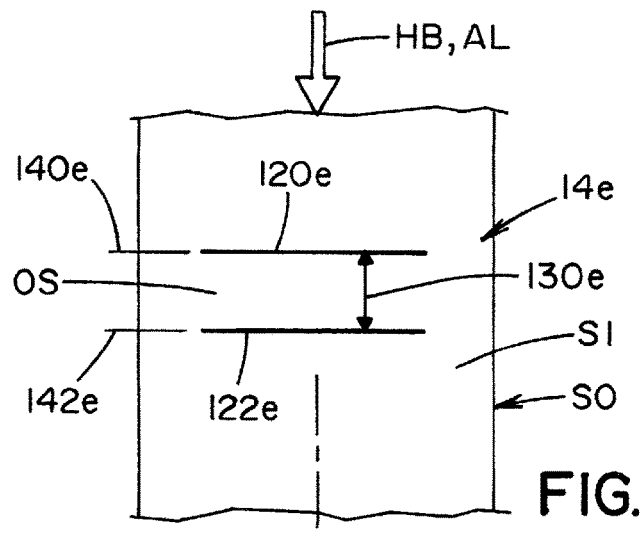
FIG. 11 is an enlarged elevational view of the marked image 14e on a first side of the structural object during the load application; and, FIG. 12 is an enlarged elevational view of the marked image 14f on a second side of the structural object during the load application.
Figure 12:
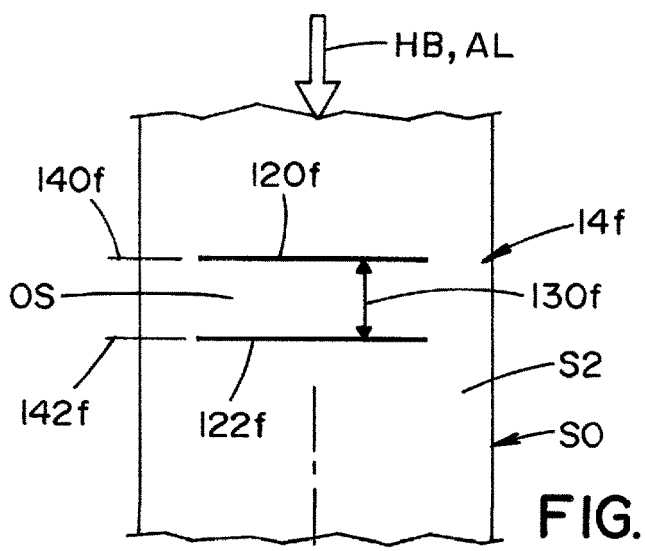

With special reference to FIGS. 10-12, shown is the same type of image arrangements 14 as discussed above. However, these figures show the use of the system of this application on two or more sides of the structural object wherein, as discussed above, the system can include image monitoring on both sides simultaneously. In this respect, FIG. 10 shows image arrangement 14*d*, which is again before a hammer blow or applied load against structural object SO. And, FIG. 10 can be representative of two identical images on both first side S1 and second side S2 of structural object SO. FIG. 11 shows the image arrangement during hammer blow HB or application load AL against structural object SO (14*e*) on first side S1 at a given time. FIG. 12 shows the image arrangement during the hammer blow or applied load against structural object SO (14*f*) on second side S2 at the same given time. Again, there can be movement over time when the load is applied (hammer blow HB or applied load AL) wherein FIGS. 11 & 12 merely shows the movements of image elements 120 and 122 at the given point in time and not necessarily for the entire duration of the applied load. Further, the image arrangements include first image element 120 and second image element 122 wherein image element 120 is longitudinally spaced from image element 122 and above image element 122 along structural axis SA. Again, any image element could be used. First and second image elements 120 and 122 are spaced by an image spacing 130. First image element 120 is at a location 140 on structural object SO and second image element 122 is at a second location 142 on structural object SO. While these locations could be identical for both sides, this is not required. Optical device 12 and/or image receiving device 16 could include a first and a second device located on both first side S1 and second side S2 as is discussed in greater detail above. System 10 could include multiple image receiving devices 16 on either side and/or could include two independent optical devices 12 on either side, which is discussed above in greater detail. Again, these devices record the specific locations of lines 120 and 122 during the load application process and they can be utilized to determine how the lines move relative to one another and move overall.

In greater detail, when the load is applied to the structural object, the entire structural object can move downwardly into ground layer G. Thus, image elements 120 and 122 will move together from locations 140*d* and 142*d* to positions 140*e* and 142*e*/140*f* and 142*f*, respectively. In addition, image element 120 can move relative to image element 122 wherein image spacing 130*e* and/or 130*f* can be unequal to image spacing 130*d*. The change in spacing between known image spacing 130*d* and image spacing 130*e* and the change in spacing between image spacing 130*d* and image spacing 130*f* can be used to calculate the strain in the structural object during the application of the load. Again, by having image readings on both sides, system 10 can determined if there is an increased amount of strain in one side of the structural object. In this respect, image spacing 130*e* and 130*f* should be equal if the strain on both sides is equal. But, if image spacing 130*e* is unequal to image spacing 130*f*, this is an indication that the strain on one side of the structural object is unequal to the strain on the other side. As can be appreciated, this can be a sign of a bending in the structural object caused by a non-uniform hammer blow and/or a defect on one side of the structural object. As noted above, once the applied load is concluded, there can be a relaxing of the structural object and further movement of the image elements both overall and relative to one another. If image spacing 130*e* remains unequal to image spacing 130*f*, it could be a sign of localized damage to the structural object on one side of the object.

According to yet other embodiments of the invention, system 10 could further include one or more visual references 160 (FIG. 1) near image arrangements 14. The visual references can be utilized to provide a reference point for the images being viewed. This can be important to make sure there is no optical device or camera movement and/or to allow optical device 12 and/or image receiving device 16 to be re-positioned if needed for any reason. The reference point can be some form of image (physical and/or electrical) that is stationary wherein the image does not move with image 14 and/or the structural object being tested. Thus, it can be used as a point of reference to further improve the accuracies of the system.

The system of this application has a wide range of applications wherein it can provide real time capacity determination, as well as determination of dynamic stresses at various locations in the structural object SO, evaluation of structural integrity, and investigation of hammer performance through the determination of energy transferred into the structural object SO. Moreover, these capacity determinations can be done quickly with minimal set up time and costs.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

It is claimed:

1. A non-contact strain and/or displacement measurement system for use with structural objects, such as load bearing structural objects, the non-contact strain measurement system comprising an optical device, a data store and an image arrangement that is fixed relative to an associated structural object, the optical device including an image receiving device for receiving visual images and the data store being operable to record the received visual images, the image receiving device being spaced from the associated structural object, the image receiving device being spaced from the image arrangement fixed relative to the associated structural object by an optical spacing such that the image receiving device has a visual range that includes a portion of the associated structural object and the image arrangement being within the portion, the image arrangement having at least one image element, the at least one image element of the image arrangement moving with the associated structural object when an associated applied force is directed against the associated structural object and the associated applied force produces an object movement in the associated structural object along the associated structural axis during a measurement period, the image receiving device receiving the visual images of movements of the at least one image element and the data store recording the visual images of the movements of the at least one image element during the measurement period, the movements of the at least one image element providing image data to calculate at least one of a structural object strain in the associated structural object and a displacement of the associated structural object during the measurement period; wherein the at least one image element includes a first image element and a second image element and the first image element and the second image element are axially spaced from one another by an image spacing; wherein the image receiving device includes a first image receiving device and a second image receiving device and the first and second image receiving devices are space from one another by an image receiving device spacing, the image receiving device spacing being generally equal to the image spacing.

2. The non-contact strain and/or displacement measurement system of claim 1 wherein the first and second image elements of the image arrangement moving with the associated structural object when the associated applied force is directed against the associated structural object and the associated applied force produces the object movement in the associated structural object along the associated structural axis during the measurement period, the image receiving device receiving the visual images of movements of the first and second image elements and the data store recording the visual images of the movements of the first and second image elements during the measurement period, the movements of the first and second image elements providing image data to calculate the at least one of the structural object strain in the associated structural object and the displacement of the associated structural object during the measurement period.

3. The non-contact strain and/or displacement measurement system of claim 2 wherein the visual range includes a first visual range and a second visual range, the first image receiving device having the first visual range and the second image receiving device having the second visual range, the first image element being in the first visual range and being spaced from the second visual range and the second image element being in the second visual range and being spaced from the first visual range.

4. The non-contact strain and/or displacement measurement system of claim 1 further including a computing device, the computing device operable to receive the image data and to calculate the at least one of a structural object strain in the associated structural object and the displacement of the associated structural object during the measurement period.

5. The non-contact strain and/or displacement measurement system of claim 2 wherein the first and second image elements are in the form of at least one of lines transverse to the associated structural axis, lines parallel to the structural axis, dots, graphs, bar codes, grids, dashes and surface texturing.

6. The non-contact strain and/or displacement measurement system of claim 1 further including an activation sensor to produce a selective data acquisition mode to reduce a file size of the image data, the activation sensor operable to detect the associated applied force and provide an activation signal to initiate the measurement period.

7. The non-contact strain and/or displacement measurement system of claim 6 wherein the measurement period includes a set time at least one of before and after the activation signal.

8. The non-contact strain and/or displacement measurement system of claim 6 wherein the activation sensor is fixed relative to the associate structural object and the activation signal is produced when the activation sensor detects movement in the associated structural object.

9. The non-contact strain and/or displacement measurement system of claim 6 wherein the activation sensor is spaced from the associate structural object and the activation signal is produced when the activation sensor detects sound waves from the application of the associated applied force.

10. The non-contact strain and/or displacement measurement system of claim 6 wherein the optical device includes the activation sensor.

11. The non-contact strain and/or displacement measurement system of claim 1 wherein the image receiving device includes at least one of a high speed camera and a line camera.

12. The non-contact strain and/or displacement measurement system of claim 1 wherein the system further includes a light emitting device.

13. The non-contact strain and/or displacement measurement system of claim 12 wherein the light emitting device at least partially produces the visual images received by the image receiving device.

14. The non-contact strain and/or displacement measurement system of claim 1 wherein the visual range is a first visual range and the first image receiving device having the first visual range, the second receiving device having a second visual range.

15. The non-contact strain and/or displacement measurement system of claim 14 wherein the first and second visual ranges are axially spaced from one another.

16. The non-contact strain and/or displacement measurement system of claim 14 wherein the first image element is in the first visual range and the second image element is in the second visual range.

17. The non-contact strain and/or displacement measurement system of claim 1 further including an optical support to support and secure the optical device, the system further including at least one of a pivot joint and a linear motion support allowing relative axial movement of the visual range relative to the associate structural object.

18. The non-contact strain and/or displacement measurement system of claim 1 wherein the optical device includes a sensor to detect the relative axial movement of the visual range.

19. The non-contact strain and/or displacement measurement system of claim 1 further including an optical support to support and secure the optical device and the optical support including a UAV, the UAV including a flight control package, at least one isolation stage and a stability package.

* * * * *